US012695550B2

(12) United States Patent
Yang et al.

(10) Patent No.: US 12,695,550 B2
(45) Date of Patent: Jul. 28, 2026

(54) HYBRID AUTOMATIC REPEAT REQUEST FEEDBACK FOR HIGH THROUGHPUT USE CASES

(71) Applicant: QUALCOMM Incorporated, San Diego, CA (US)

(72) Inventors: Wei Yang, San Diego, CA (US); Chih-Hao Liu, San Diego, CA (US); Jing Sun, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 307 days.

(21) Appl. No.: 18/533,712

(22) Filed: Dec. 8, 2023

(65) Prior Publication Data

US 2025/0192926 A1      Jun. 12, 2025

(51) Int. Cl.
| | |
|---|---|
| *H04L 1/1829* | (2023.01) |
| *H04W 72/1273* | (2023.01) |
| *H04W 72/21* | (2023.01) |

(52) U.S. Cl.
CPC ....... *H04L 1/1854* (2013.01); *H04W 72/1273* (2013.01); *H04W 72/21* (2023.01)

(58) Field of Classification Search
CPC .. H04W 72/1273; H04W 72/21; H04L 1/1854
USPC ......................................................... 370/329
See application file for complete search history.

(56) References Cited

U.S. PATENT DOCUMENTS

2022/0393808 A1* 12/2022 Yang ..................... H04W 72/23

700 ——▸

2024/0348380 A1* 10/2024 MolavianJazi ..... H04W 72/232
2024/0388387 A1* 11/2024 Shariatmadari ... H04W 72/0446
2025/0105950 A1* 3/2025 Kanamarlapudi .... H04L 1/0009

FOREIGN PATENT DOCUMENTS

| EP | 4160966 A1 | 4/2023 |
|---|---|---|
| WO | 2021217678 A1 | 11/2021 |

OTHER PUBLICATIONS

International Search Report and Written Opinion—PCT/US2024/051577—ISA/EPO—Jan. 29, 2025.
Sequans: "HARQ Enhancements for URLLC", 3GPP Draft, 3GPP TSG RAN WG1 Meeting #95, R1-1813540, 3rd Generation Partnership Project, Mobile Competence Centre, 650, Route Des Lucioles, F-06921 Sophia-Antipolis Cedex, France, vol. RAN WG1, No. Spokane, USA, Nov. 12, 2018-Nov. 16, 2018, Nov. 11, 2018, XP051555595, 2 pages, p. 1.

* cited by examiner

*Primary Examiner* — Peter G Solinsky
(74) *Attorney, Agent, or Firm* — Harrity & Harrity, LLP

(57) ABSTRACT

Various aspects of the present disclosure generally relate to wireless communication. In some aspects, a user equipment (UE) may receive, from a network node, a downlink grant scheduling a physical downlink shared channel (PDSCH) transmission that includes a transport block (TB) associated with a first hybrid automatic repeat request (HARQ) acknowledgment (HARQ-ACK) feedback occasion and a second HARQ-ACK feedback occasion, wherein the downlink grant schedules at least the first HARQ-ACK feedback occasion associated with the TB. The UE may transmit, to the network node, HARQ feedback for the TB in one or more of the first HARQ-ACK feedback occasion or the second HARQ-ACK feedback occasion associated with the TB. Numerous other aspects are described.

30 Claims, 10 Drawing Sheets

550
DL grant scheduling TB transmission and indicating PUCCH resource for HARQ-ACK feedback 570
Grant indicating 2nd resource for HARQ-ACK feedback based on pending indication 580
HARQ-ACK feedback indicating TB decoding result 560
HARQ-ACK feedback with pending indication

PDSCH

500

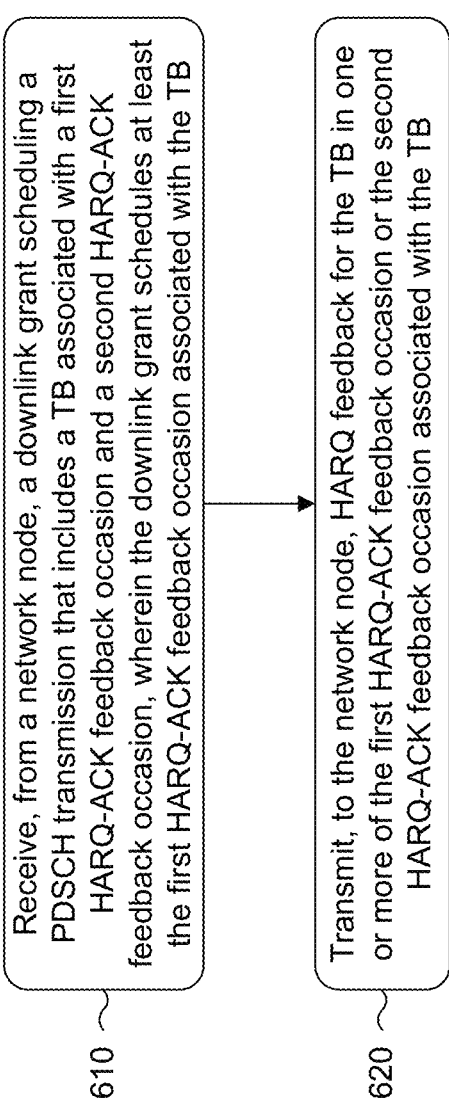

Receive, from a network node, a downlink grant scheduling a PDSCH transmission that includes a TB associated with a first HARQ-ACK feedback occasion and a second HARQ-ACK feedback occasion, wherein the downlink grant schedules at least the first HARQ-ACK feedback occasion associated with the TB

610

Transmit, to the network node, HARQ feedback for the TB in one or more of the first HARQ-ACK feedback occasion or the second HARQ-ACK feedback occasion associated with the TB

700

710 Transmit, to a UE, a downlink grant scheduling a PDSCH transmission that includes a TB associated with a first HARQ-ACK feedback occasion and a second HARQ-ACK feedback occasion, wherein the downlink grant schedules at least the first HARQ-ACK feedback occasion associated with the TB 720 Receive, from the UE, HARQ feedback for the TB in one or more of the first HARQ-ACK feedback occasion or the second HARQ-ACK feedback occasion associated with the TB

FIG. 7

HYBRID AUTOMATIC REPEAT REQUEST FEEDBACK FOR HIGH THROUGHPUT USE CASES

FIELD OF THE DISCLOSURE

Aspects of the present disclosure generally relate to wireless communication and specifically relate to techniques, apparatuses, and methods for hybrid automatic repeat request (HARQ) feedback for high throughput use cases.

BACKGROUND

Wireless communication systems are widely deployed to provide various services that may include carrying voice, text, messaging, video, data, and/or other traffic. The services may include unicast, multicast, and/or broadcast services, among other examples. Typical wireless communication systems may employ multiple-access radio access technologies (RATs) capable of supporting communication with multiple users by sharing available system resources (for example, time domain resources, frequency domain resources, spatial domain resources, and/or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

The above multiple-access RATs have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies (for example, cellular vehicle-to-everything (CV2X) communication), massive multiple-input multiple-output (MIMO), disaggregated network architectures and network topology expansions, multiple-subscriber implementations, high-precision positioning, and/or radio frequency (RF) sensing, among other examples. As the demand for mobile broadband access continues to increase, further improvements in NR may be implemented, and other radio access technologies such as 6G may be introduced, to further advance mobile broadband evolution.

SUMMARY

Some aspects described herein relate to a user equipment (UE) for wireless communication. The UE may include one or more memories and one or more processors coupled to the one or more memories. The one or more processors may be configured to receive, from a network node, a downlink grant scheduling a physical downlink shared channel (PDSCH) transmission that includes a transport block (TB)

associated with a first hybrid automatic repeat request (HARQ) acknowledgment (HARQ-ACK) feedback occasion and a second HARQ-ACK feedback occasion, wherein the downlink grant schedules at least the first HARQ-ACK feedback occasion associated with the TB. The one or more processors may be configured to transmit, to the network node, HARQ feedback for the TB in one or more of the first HARQ-ACK feedback occasion or the second HARQ-ACK feedback occasion associated with the TB.

Some aspects described herein relate to a network node for wireless communication. The network node may include one or more memories and one or more processors coupled to the one or more memories. The one or more processors may be configured to transmit, to a UE, a downlink grant scheduling a PDSCH transmission that includes a TB associated with a first HARQ-ACK feedback occasion and a second HARQ-ACK feedback occasion, wherein the downlink grant schedules at least the first HARQ-ACK feedback occasion associated with the TB associated with the TB. The one or more processors may be configured to receive, from the UE, HARQ feedback for the TB in one or more of the first HARQ-ACK feedback occasion or the second HARQ-ACK feedback occasion associated with the TB.

Some aspects described herein relate to a method of wireless communication performed by a UE. The method may include receiving, from a network node, a downlink grant scheduling a PDSCH transmission that includes a TB associated with a first HARQ-ACK feedback occasion and a second HARQ-ACK feedback occasion, wherein the downlink grant schedules at least the first HARQ-ACK feedback occasion associated with the TB associated with the TB. The method may include transmitting, to the network node, HARQ feedback for the TB in one or more of the first HARQ-ACK feedback occasion or the second HARQ-ACK feedback occasion associated with the TB.

Some aspects described herein relate to a method of wireless communication performed by a network node. The method may include transmitting, to a UE, a downlink grant scheduling a PDSCH transmission that includes a TB associated with a first HARQ-ACK feedback occasion and a second HARQ-ACK feedback occasion, wherein the downlink grant schedules at least the first HARQ-ACK feedback occasion associated with the TB associated with the TB. The method may include receiving, from the UE, HARQ feedback for the TB in one or more of the first HARQ-ACK feedback occasion or the second HARQ-ACK feedback occasion associated with the TB.

Some aspects described herein relate to a non-transitory computer-readable medium that stores a set of instructions for wireless communication by a UE. The set of instructions, when executed by one or more processors of the UE, may cause the UE to receive, from a network node, a downlink grant scheduling a PDSCH transmission that includes a TB associated with a first HARQ-ACK feedback occasion and a second HARQ-ACK feedback occasion, wherein the downlink grant schedules at least the first HARQ-ACK feedback occasion associated with the TB associated with the TB. The set of instructions, when executed by one or more processors of the UE, may cause the UE to transmit, to the network node, HARQ feedback for the TB in one or more of the first HARQ-ACK feedback occasion or the second HARQ-ACK feedback occasion associated with the TB.

Some aspects described herein relate to a non-transitory computer-readable medium that stores a set of instructions for wireless communication by a network node. The set of instructions, when executed by one or more processors of the network node, may cause the network node to transmit, to a UE, a downlink grant scheduling a PDSCH transmission that includes a TB associated with a first HARQ-ACK feedback occasion and a second HARQ-ACK feedback occasion, wherein the downlink grant schedules at least the first HARQ-ACK feedback occasion associated with the TB associated with the TB. The set of instructions, when executed by one or more processors of the network node, may cause the network node to receive, from the UE, HARQ feedback for the TB in one or more of the first HARQ-ACK feedback occasion or the second HARQ-ACK feedback occasion associated with the TB.

Some aspects described herein relate to an apparatus for wireless communication. The apparatus may include means for receiving, from a network node, a downlink grant scheduling a PDSCH transmission that includes a TB associated with a first HARQ-ACK feedback occasion and a second HARQ-ACK feedback occasion, wherein the downlink grant schedules at least the first HARQ-ACK feedback occasion associated with the TB associated with the TB. The apparatus may include means for transmitting, to the network node, HARQ feedback for the TB in one or more of the first HARQ-ACK feedback occasion or the second HARQ-ACK feedback occasion associated with the TB.

Some aspects described herein relate to an apparatus for wireless communication. The apparatus may include means for transmitting, to a UE, a downlink grant scheduling a PDSCH transmission that includes a TB associated with a first HARQ-ACK feedback occasion and a second HARQ-ACK feedback occasion, wherein the downlink grant schedules at least the first HARQ-ACK feedback occasion associated with the TB associated with the TB. The apparatus may include means for receiving, from the UE, HARQ feedback for the TB in one or more of the first HARQ-ACK feedback occasion or the second HARQ-ACK feedback occasion associated with the TB.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, the specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure, but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

FIG. 6 is a flowchart illustrating an example process performed, for example, by a UE in accordance with the present disclosure.

FIG. 7 is a flowchart illustrating an example process performed, for example, by a network node in accordance with the present disclosure.

DETAILED DESCRIPTION

Figure 1:
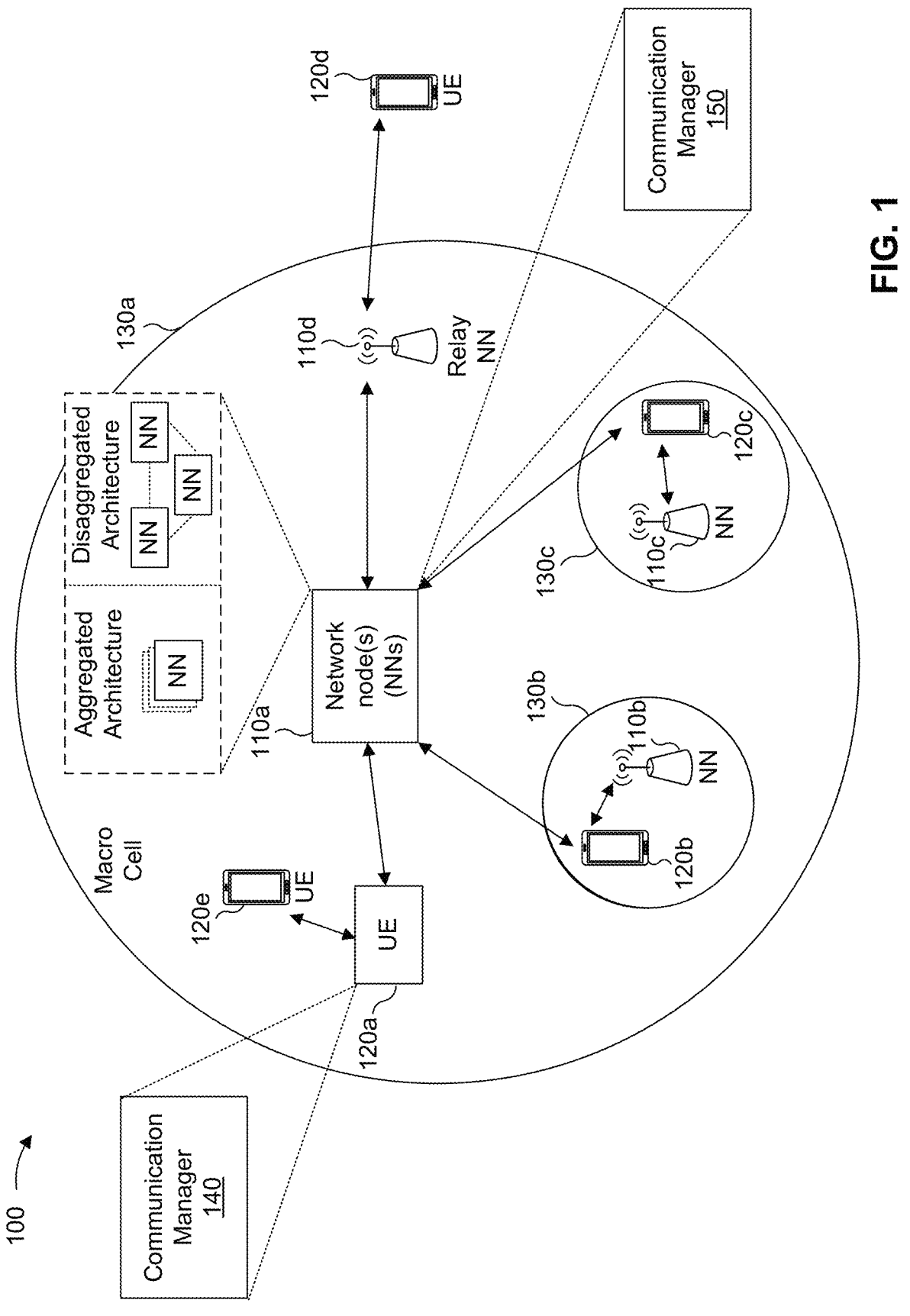
FIG. 1 is a diagram illustrating an example of a wireless network in accordance with the present disclosure.

Various aspects of the present disclosure are described hereinafter with reference to the accompanying drawings. However, aspects of the present disclosure may be embodied in many different forms and is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures and/or functionalities in addition to or other than the structures and/or functionalities with which various aspects of the disclosure set forth herein may be practiced. Any aspect of the disclosure disclosed herein may be embodied by one or more elements of a claim.

Several aspects of telecommunication systems will now be presented with reference to various methods, operations, apparatuses, and techniques. These methods, operations, apparatuses, and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

As described herein, hybrid automatic repeat request (HARQ) includes a combination of high-rate forward error correction (FEC) and automatic repeat request (ARQ) error-control. In ARQ, a transmitter may add redundant bits to a message to be transmitted using an error-detecting code, such as a cyclic redundancy check (CRC), and a receiver that fails to correctly decode the message (e.g., based on the CRC) may request a retransmission of the message from the transmitter. In HARQ, the original data may be encoded with an FEC code, and parity bits may be sent along with the message or transmitted upon request from the receiver in connection with the receiver detecting a failure to correctly decode the message. In HARQ, when a receiver (e.g., a UE) receives a transmission (e.g., a physical downlink shared channel (PDSCH) transmission) that carries a transport block (TB) and the receiver is unable to correctly decode the TB, the receiver may store information from the incorrectly decoded TB in a HARQ buffer. Accordingly, when the receiver subsequently receives a retransmission of the TB (e.g., after requesting the retransmission by transmitting a negative acknowledgement (NACK) in a HARQ acknowledgement (HARQ-ACK) feedback occasion), the receiver may perform soft combining to combine the information stored in the HARQ buffer with information from the retransmitted TB in an attempt to decode the combined information. For example, the receiver may use log-likelihood ratio (LLR) soft combining to combine multiple transmissions of a message. In this case, the receiver may store, in the HARQ buffer, LLR values for the demodulator output for a transmission of a message (e.g., a respective LLR value for each bit in the received message), and may then combine the stored LLR values with LLR values for the demodulator output for a retransmission of the message prior to decoding the combined LLR values.

Incremental redundancy HARQ (IR-HARQ) is a HARQ technique in which multiple sets of coded bits may be generated, each representing the same set of information bits. In this case, a retransmission may use a different set of coded bits from a previous transmission, with different redundancy versions (RVs) generated by puncturing the encoder output. In this way, IR-HARQ may provide robustness against inaccurate rate control, bursty interference, fading channels, or other issues that may reduce reliability of a data channel in addition to improving coverage and spectral efficiency. For example, a receiver (e.g., a UE 120) may support IR-HARQ by performing rate matching of low density parity check (LDPC) codes using a circular buffer that may be filled with an ordered sequence of systematic bits and parity bits.

However, the benefits associated with IR-HARQ come at a cost, in that a receiver generally requires a large amount of memory to store the HARQ LLRs that are used to enable soft combining for a large number of HARQ processes. In general, approaches to mitigate the large memory requirements associated with IR-HARQ have focused on attempting to minimize a soft buffer memory footprint. However, minimizing the soft buffer memory footprint may not be well-suited to high throughput use cases. For example, as wireless communication technologies evolve to support very high throughputs, the memory size that is available for IR-HARQ needs to scale with the increased throughput in order to store the HARQ LLRs used for soft combining (e.g., 20 megabytes of memory may be needed to store the HARQ LLRs for a throughput of 10 gigabits per second (Gbps), and the memory requirements increase linearly with the throughput). Accordingly, IR-HARQ designs are experiencing a paradigm shift based on a change to modem architectures, where storage of HARQ LLRs is increasingly offloaded to double data rate (DDR) memory. As a result, DDR bandwidth (rather than HARQ soft buffer size) is becoming a bottleneck to IR-HARQ performance due to the offloading of HARQ LLR storage to DDR memory. However, increasing the DDR bandwidth poses various challenges, including that DDR memories with a bandwidth that supports multiple hundreds of Gbps may be needed to support a 50 Gbps throughput without throttling, which increases costs because the UE would need multiple low-power DDR (LPDDR) memories to support the increased bandwidth.

Various aspects described herein generally relate to techniques that may be used to maintain the benefits of IR-HARQ for high throughput use cases while limiting or avoiding a need to increase a DDR bandwidth. For example, as described herein, IR-HARQ operation may generally require DDR access to offload storage of successfully decoded downlink information bits, to offload storage of LLRs for downlink decoding failures, to onload storage of uplink information bits to be transmitted, and to onload storage of downlink retransmission LLRs. In general, offloading the storage of successfully decoded downlink information bits and onloading storage of uplink information bits to be transmitted cannot be delayed, because an uplink and downlink data rate would otherwise be unsustainable. However, offloading storage of LLRs for downlink decoding failures and onloading storage of downlink retransmission LLRs can be tapered down to postpone or slow down DDR access when a DDR bandwidth limit is reached. However, when the DDR bandwidth limit is reached, postponing or slowing DDR access may cause a delay to HARQ operations (e.g., soft combining).

Accordingly, various aspects described herein relate to a HARQ design that may support high throughput use cases where HARQ operations may potentially be delayed. For example, in some aspects, a PDSCH transmission that carries a TB may be associated with multiple HARQ-ACK feedback occasions that are separated in time (e.g., in different slots or symbols), where an initial HARQ-ACK feedback occasion may be associated with a regular HARQ-ACK timeline (e.g., corresponding to an N1 parameter, or PDSCH processing time). Accordingly, in cases where the UE is able to decode the TB before the initial HARQ-ACK feedback occasion without experiencing DDR issues or other delays to HARQ operation, the UE may use the initial HARQ-ACK feedback occasion to transmit an ACK or a NACK for the PDSCH transmission. Furthermore, the multiple HARQ-ACK feedback occasions may include one or more HARQ-ACK feedback occasions that are later in time relative to the initial HARQ-ACK feedback occasion, whereby the UE may spend more time decoding the TB and use the later (delayed) HARQ-ACK feedback occasion(s) to transmit ACK/NACK feedback in cases where a slower DDR onloading or offloading or other issues delay HARQ operation. Furthermore, some aspects described herein relate to UE behavior in the later HARQ-ACK feedback occasion(s) when an ACK is transmitted in an earlier HARQ-ACK feedback occasion, and to UE behavior in cases when the UE has not finished the attempted decoding before an earlier HARQ-ACK feedback occasion. Furthermore, some aspects described herein relate to techniques that a network node may use to indicate the multiple HARQ-ACK resources to the UE, and to n-state HARQ-ACK feedback, where n is greater than two such that the n-state HARQ-ACK feedback May differentiate between an ACK to indicate to a correctly decoded TB, a NACK to indicate a failed decoding, and a pending state to indicate that the UE needs more time to complete the attempted decoding due to DDR congestion or other issues.

Particular aspects of the subject matter described in this disclosure can be implemented to realize one or more of the following potential advantages. In some examples, by configuring multiple HARQ-ACK feedback occasions for a PDSCH transmission that carries a TB, the benefits of IR-HARQ such as increased robustness, improved coverage, and improved spectral efficiency may be preserved for high throughput use cases while limiting or avoiding a need to increase a DDR bandwidth. In this way, the described techniques can be used to reduce a DDR bandwidth requirement, which may result in a lower UE cost, while also allowing the UE to support very high throughputs (e.g., 100 Gbps or more) with a limited increase in DDR memory (e.g., relative to current UE implementations that typically support only up to a 10 Gbps throughput due to DDR bandwidth challenges). Furthermore, the described techniques can avoid a need to proportionally or linearly increase a DDR memory footprint to support a throughput increase (e.g., a 10× throughput increase may require less than a 10× increase in DDR memory size). Furthermore, in cases where a TB fails due to DDR congestion, the described techniques allow the network node to give the UE more time to decode the TB, rather than retransmitting the same TB, which reduces transmit power of the network node and conserves network resources.

Multiple-access radio access technologies (RATs) have been adopted in various telecommunication standards to provide common protocols that enable wireless communication devices to communicate on a municipal, enterprise, national, regional, or global level. For example, 5G New Radio (NR) is part of a continuous mobile broadband evolution promulgated by the Third Generation Partnership Project (3GPP). 5G NR supports various technologies and use cases including enhanced mobile broadband (eMBB), ultra-reliable low-latency communication (URLLC), massive machine-type communication (mMTC), millimeter wave (mmWave) technology, beamforming, network slicing, edge computing, Internet of Things (IoT) connectivity and management, and network function virtualization (NFV).

As the demand for broadband access increases and as technologies supported by wireless communication networks evolve, further technological improvements may be adopted in or implemented for 5G NR or future RATs, such as 6G, to further advance the evolution of wireless communication for a wide variety of existing and new use cases and applications. Such technological improvements may be associated with new frequency band expansion, licensed and unlicensed spectrum access, overlapping spectrum use, small cell deployments, non-terrestrial network (NTN) deployments, disaggregated network architectures and network topology expansion, device aggregation, advanced duplex communication, sidelink and other device-to-device direct communication, IoT (including passive or ambient IoT) networks, reduced capability (RedCap) UE functionality, industrial connectivity, multiple-subscriber implementations, high-precision positioning, radio frequency (RF) sensing, and/or artificial intelligence or machine learning (AI/ML), among other examples. These technological improvements may support use cases such as wireless backhauls, wireless data centers, extended reality (XR) and metaverse applications, meta services for supporting vehicle connectivity, holographic and mixed reality communication, autonomous and collaborative robots, vehicle platooning and cooperative maneuvering, sensing networks, gesture monitoring, human-brain interfacing, digital twin applications, asset management, and universal coverage applications using non-terrestrial and/or aerial platforms, among other examples. The methods, operations, apparatuses, and techniques described herein may enable one or more of the foregoing technologies and/or support one or more of the foregoing use cases.

FIG. 1 is a diagram illustrating an example of a wireless communication network 100 in accordance with the present disclosure. The wireless communication network 100 may be or may include elements of a 5G (or NR) network or a 6G network, among other examples. The wireless communication network 100 may include multiple network nodes 110, shown as a network node (NN) 110a, a network node 110b, a network node 110c, and a network node 110d. The network nodes 110 may support communications with multiple UEs 120, shown as a UE 120a, a UE 120b, a UE 120c, a UE 120d, and a UE 120e.

The network nodes 110 and the UEs 120 of the wireless communication network 100 may communicate using the electromagnetic spectrum, which may be subdivided by frequency or wavelength into various classes, bands, carriers, and/or channels. For example, devices of the wireless communication network 100 may communicate using one or more operating bands. In some aspects, multiple wireless networks 100 may be deployed in a given geographic area. Each wireless communication network 100 may support a particular RAT (which may also be referred to as an air interface) and may operate on one or more carrier frequencies in one or more frequency ranges. Examples of RATs include a 4G RAT, a 5G/NR RAT, and/or a 6G RAT, among other examples. In some examples, when multiple RATs are deployed in a given geographic area, each RAT in the geographic area may operate on different frequencies to avoid interference with one another.

Various operating bands have been defined as frequency range designations FR1 (410 MHz through 7.125 GHz), FR2 (24.25 GHz through 52.6 GHZ), FR3 (7.125 GHz through 24.25 GHZ), FR4a or FR4-1 (52.6 GHz through 71 GHZ), FR4 (52.6 GHz through 114.25 GHZ), and FR5 (114.25 GHz through 300 GHz). Although a portion of FR1 is greater than 6 GHz, FR1 is often referred to (interchangeably) as a "Sub-6 GHz" band in some documents and articles. Similarly, FR2 is often referred to (interchangeably) as a "millimeter wave" band in some documents and articles, despite being different than the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into mid-band frequencies. Thus, "sub-6 GHz," if used herein, may broadly refer to frequencies that are less than 6 GHZ, that are within FR1, and/or that are included in mid-band frequencies. Similarly, the term "millimeter wave," if used herein, may broadly refer to frequencies that are included in mid-band frequencies, that are within FR2, FR4, FR4-a or FR4-1, or FR5, and/or that are within the EHF band. Higher frequency bands may extend 5G NR operation, 6G operation, and/or other RATs beyond 52.6 GHz. For example, each of FR4a, FR4-1, FR4, and FR5 falls within the EHF band. In some examples, the wireless communication network 100 may implement dynamic spectrum sharing (DSS), in which multiple RATs (for example, 4G/LTE and 5G/NR) are implemented with dynamic bandwidth allocation (for example, based on user demand) in a single frequency band. It is contemplated that the frequencies included in these operating bands (for example, FR1, FR2, FR3, FR4, FR4-a, FR4-1, and/or FR5) may be modified, and techniques described herein may be applicable to those modified frequency ranges.

A network node 110 may include one or more devices, components, or systems that enable communication between a UE 120 and one or more devices, components, or systems of the wireless communication network 100. A network node 110 may be, may include, or may also be referred to as an NR network node, a 5G network node, a 6G network node, a Node B, an eNB, a gNB, an access point (AP), a transmission reception point (TRP), a mobility element, a core, a network entity, a network element, a network equipment, and/or another type of device, component, or system included in a radio access network (RAN).

A network node 110 may be implemented as a single physical node (for example, a single physical structure) or may be implemented as two or more physical nodes (for example, two or more distinct physical structures). For example, a network node 110 may be a device or system that implements part of a radio protocol stack, a device or system that implements a full radio protocol stack (such as a full gNB protocol stack), or a collection of devices or systems that collectively implement the full radio protocol stack. For example, and as shown, a network node 110 may be an aggregated network node (having an aggregated architecture), meaning that the network node 110 may implement a full radio protocol stack that is physically and logically integrated within a single node (for example, a single physical structure) in the wireless communication network 100. For example, an aggregated network node 110 may consist of a single standalone base station or a single TRP that uses a full radio protocol stack to enable or facilitate communication between a UE 120 and a core network of the wireless communication network 100.

Alternatively, and as also shown, a network node 110 may be a disaggregated network node (sometimes referred to as a disaggregated base station), meaning that the network node 110 may implement a radio protocol stack that is physically distributed and/or logically distributed among two or more nodes in the same geographic location or in different geographic locations. For example, a disaggregated network node may have a disaggregated architecture. In some deployments, disaggregated network nodes 110 may be used in an integrated access and backhaul (IAB) network, in an open radio access network (O-RAN) (such as a network configuration in compliance with the O-RAN Alliance), or in a virtualized radio access network (vRAN), also known as a cloud radio access network (C-RAN), to facilitate scaling by separating base station functionality into multiple units that can be individually deployed.

The network nodes 110 of the wireless communication network 100 may include one or more central units (CUs), one or more distributed units (DUs), and/or one or more radio units (RUs). A CU may host one or more higher layer control functions, such as radio resource control (RRC) functions, packet data convergence protocol (PDCP) functions, and/or service data adaptation protocol (SDAP) functions, among other examples. A DU may host one or more of a radio link control (RLC) layer, a medium access control (MAC) layer, and/or one or more higher physical (PHY) layers depending, at least in part, on a functional split, such as a functional split defined by the 3GPP. In some examples, a DU also may host one or more lower PHY layer functions, such as a fast Fourier transform (FFT), an inverse FFT (iFFT), beamforming, physical random access channel (PRACH) extraction and filtering, and/or scheduling of resources for one or more UEs 120, among other examples.

An RU may host RF processing functions or lower PHY layer functions, such as an FFT, an iFFT, beamforming, or PRACH extraction and filtering, among other examples, according to a functional split, such as a lower layer functional split. In such an architecture, each RU can be operated to handle over the air (OTA) communication with one or more UEs 120.

In some aspects, a single network node 110 may include a combination of one or more CUs, one or more DUs, and/or one or more RUs. Additionally or alternatively, a network node 110 may include one or more Near-Real Time (Near-RT) RAN Intelligent Controllers (RICs) and/or one or more Non-Real Time (Non-RT) RICs. In some examples, a CU, a DU, and/or an RU may be implemented as a virtual unit, such as a virtual central unit (VCU), a virtual distributed unit (VDU), or a virtual radio unit (VRU), among other examples. A virtual unit may be implemented as a virtual network function, such as associated with a cloud deployment.

Some network nodes 110 (for example, a base station, an RU, or a TRP) may provide communication coverage for a particular geographic area. In the 3GPP, the term "cell" can refer to a coverage area of a network node 110 or to a network node 110 itself, depending on the context in which the term is used. A network node 110 may support one or multiple (for example, three) cells. In some examples, a network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In some examples, a cell may not necessarily be stationary. For example, the geographic area of the cell may move according to the location of an associated mobile network node 110 (for example, a train, a satellite base station, an unmanned aerial vehicle, or an NTN network node).

The wireless communication network 100 may be a heterogeneous network that includes network nodes 110 of different types, such as macro network nodes, pico network nodes, femto network nodes, relay network nodes, aggregated network nodes, and/or disaggregated network nodes, among other examples. In the example shown in FIG. 1, the network node 110a may be a macro network node for a macro cell 130a, the network node 110b may be a pico network node for a pico cell 130b, and the network node 110c may be a femto network node for a femto cell 130c. Various different types of network nodes 110 may generally transmit at different power levels, serve different coverage areas, and/or have different impacts on interference in the wireless communication network 100 than other types of network nodes 110. For example, macro network nodes may have a high transmit power level (for example, 5 to 40 watts), whereas pico network nodes, femto network nodes, and relay network nodes may have lower transmit power levels (for example, 0.1 to 2 watts).

In some examples, a network node 110 may be, may include, or may operate as an RU, a TRP, or a base station that communicates with one or more UEs 120 via a radio access link (which may be referred to as a "Uu" link). The radio access link may include a downlink and an uplink. "Downlink" (or "DL") refers to a communication direction from a network node 110 to a UE 120, and "uplink" (or "UL") refers to a communication direction from a UE 120 to a network node 110. Downlink channels may include one or more control channels and one or more data channels. A downlink control channel may be used to transmit downlink control information (DCI) (for example, scheduling information, reference signals, and/or configuration information) from a network node 110 to a UE 120. A downlink data channel may be used to transmit downlink data (for example, user data associated with a UE 120) from a network node 110 to a UE 120. Downlink control channels may include one or more physical downlink control channels (PDCCHs), and downlink data channels may include one or more PDSCHs. Uplink channels may similarly include one or more control channels and one or more data channels. An uplink control channel may be used to transmit uplink control information (UCI) (for example, reference signals and/or feedback corresponding to one or more downlink transmissions) from a UE 120 to a network node 110. An uplink data channel may be used to transmit uplink data (for example, user data associated with a UE 120) from a UE 120 to a network node 110. Uplink control channels may include one or more physical uplink control channels (PUCCHs), and uplink data channels may include one or more physical uplink shared channels (PUSCHs). The downlink and the uplink may each include a set of resources on which the network node 110 and the UE 120 may communicate.

Downlink and uplink resources may include time domain resources (frames, subframes, slots, and/or symbols), frequency domain resources (frequency bands, component carriers, subcarriers, resource blocks, and/or resource elements), and/or spatial domain resources (particular transmit directions and/or beam parameters). Frequency domain resources of some bands may be subdivided into bandwidth parts (BWPs). A BWP may be a continuous block of frequency domain resources (for example, a continuous block of resource blocks) that are allocated for one or more UEs 120. A UE 120 may be configured with both an uplink BWP and a downlink BWP (where the uplink BWP and the downlink BWP may be the same BWP or different BWPs). A BWP may be dynamically configured (for example, by a network node 110 transmitting a DCI configuration to the one or more UEs 120) and/or reconfigured, which means that a BWP can be adjusted in real-time (or near-real-time) based on changing network conditions in the wireless communication network 100 and/or based on the specific requirements of the one or more UEs 120. This enables more efficient use of the available frequency domain resources in the wireless communication network 100 because fewer frequency domain resources may be allocated to a BWP for a UE 120 (which may reduce the quantity of frequency domain resources that a UE 120 is required to monitor), leaving more frequency domain resources to be spread across multiple UEs 120. Thus, BWPs may also assist in the implementation of lower-capability UEs 120 by facilitating the configuration of smaller bandwidths for communication by such UEs 120.

As described above, in some aspects, the wireless communication network 100 may be, may include, or may be included in, an IAB network. In an IAB network, at least one network node 110 is an anchor network node that communicates with a core network. An anchor network node 110 may also be referred to as an IAB donor (or "IAB-donor"). The anchor network node 110 may connect to the core network via a wired backhaul link. For example, an Ng interface of the anchor network node 110 may terminate at the core network. Additionally or alternatively, an anchor network node 110 may connect to one or more devices of the core network that provide a core access and mobility management function (AMF). An IAB network also generally includes multiple non-anchor network nodes 110, which may also be referred to as relay network nodes or simply as IAB nodes (or "IAB-nodes"). Each non-anchor network node 110 may communicate directly with the anchor network node 110 via a wireless backhaul link to access the core network, or may communicate indirectly with the anchor network node 110 via one or more other non-anchor network nodes 110 and associated wireless backhaul links that form a backhaul path to the core network. Some anchor network node 110 or other non-anchor network node 110 may also communicate directly with one or more UEs 120 via wireless access links that carry access traffic. In some examples, network resources for wireless communication (such as time resources, frequency resources, and/or spatial resources) may be shared between access links and backhaul links.

In some examples, any network node 110 that relays communications may be referred to as a relay network node, a relay station, or simply as a relay. A relay may receive a transmission of a communication from an upstream station (for example, another network node 110 or a UE 120) and transmit the communication to a downstream station (for example, a UE 120 or another network node 110). In this case, the wireless communication network 100 may include or be referred to as a "multi-hop network." In the example shown in FIG. 1, the network node 110d (for example, a relay network node) may communicate with the network node 110a (for example, a macro network node) and the UE 120d in order to facilitate communication between the network node 110a and the UE 120d. Additionally or alternatively, a UE 120 may be or may operate as a relay station that can relay transmissions to or from other UEs 120. A UE 120 that relays communications may be referred to as a UE relay or a relay UE, among other examples.

The UEs 120 may be physically dispersed throughout the wireless communication network 100, and each UE 120 may be stationary or mobile. A UE 120 may be, may include, or may be included in an access terminal, another terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, and/or smart jewelry, such as a smart ring or a smart bracelet), an entertainment device (for example, a music device, a video device, and/or a satellite radio), an XR device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium.

A UE 120 and/or a network node 110 may include one or more chips, system-on-chips (SoCs), chipsets, packages, or devices that individually or collectively constitute or comprise a processing system. The processing system includes processor (or "processing") circuitry in the form of one or multiple processors, microprocessors, processing units (such as central processing units (CPUs), graphics processing units (GPUs), neural processing units (NPUs) and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions.

The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code (such as software) that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G, or 6G compliant) modem). In some implementations, one or more processors of the processing system include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains or transceivers. The UE 120 may include or may be included in a housing that houses components associated with the UE 120 including the processing system.

Some UEs 120 may be considered machine-type communication (MTC) UEs, evolved or enhanced machine-type communication (eMTC), UEs, further enhanced eMTC (feMTC) UEs, or enhanced feMTC (efeMTC) UEs, or further evolutions thereof, all of which may be simply referred to as "MTC UEs". An MTC UE may be, may include, or may be included in or coupled with a robot, an uncrewed aerial vehicle, a remote device, a sensor, a meter, a monitor, and/or a location tag. Some UEs 120 may be considered IoT devices and/or may be implemented as NB-IoT (narrowband IoT) devices. An IoT UE or NB-IoT device may be, may include, or may be included in or coupled with an industrial machine, an appliance, a refrigerator, a doorbell camera device, a home automation device, and/or a light fixture, among other examples. Some UEs 120 may be considered Customer Premises Equipment, which may include telecommunications devices that are installed at a customer location (such as a home or office) to enable access to a service provider's network (such as included in or in communication with the wireless communication network 100).

Some UEs 120 may be classified according to different categories in association with different complexities and/or different capabilities. UEs 120 in a first category may facilitate massive IoT in the wireless communication network 100, and may offer low complexity and/or cost relative to UEs 120 in a second category. UEs 120 in a second category may include mission-critical IoT devices, legacy UEs, baseline UEs, high-tier UEs, advanced UEs, full-capability UEs, and/or premium UEs that are capable of URLLC, enhanced mobile broadband (eMBB), and/or precise positioning in the wireless communication network 100, among other examples. A third category of UEs 120 may have mid-tier complexity and/or capability (for example, a capability between UEs 120 of the first category and UEs 120 of the second capability). A UE 120 of the third category may be referred to as a reduced capacity UE ("RedCap UE"), a mid-tier UE, an NR-Light UE, and/or an NR-Lite UE, among other examples. RedCap UEs may bridge a gap between the capability and complexity of NB-IoT devices and/or eMTC UEs, and mission-critical IoT devices and/or premium UEs. RedCap UEs may include, for example, wearable devices, IoT devices, industrial sensors, and/or cameras that are associated with a limited bandwidth, power capacity, and/or transmission range, among other examples. RedCap UEs may support healthcare environments, building automation, electrical distribution, process automation, transport and logistics, and/or smart city deployments, among other examples.

In some examples, two or more UEs 120 (for example, shown as UE 120a and UE 120e) may communicate directly with one another using sidelink communications (for example, without communicating by way of a network node 110 as an intermediary). As an example, the UE 120a may directly transmit data, control information, or other signaling as a sidelink communication to the UE 120e. This is in contrast to, for example, the UE 120a first transmitting data in an UL communication to a network node 110, which then transmits the data to the UE 120e in a DL communication. In various examples, the UEs 120 may transmit and receive sidelink communications using peer-to-peer (P2P) communication protocols, device-to-device (D2D) communication protocols, vehicle-to-everything (V2X) communication protocols (which may include vehicle-to-vehicle (V2V) protocols, vehicle-to-infrastructure (V2I) protocols, and/or vehicle-to-pedestrian (V2P) protocols), and/or mesh network communication protocols. In some deployments and configurations, a network node 110 may schedule and/or allocate resources for sidelink communications between UEs 120 in the wireless communication network 100. In some other deployments and configurations, a UE 120 (instead of a network node 110) may perform, or collaborate or negotiate with one or more other UEs to perform, scheduling operations, resource selection operations, and/or other operations for sidelink communications.

In various examples, some of the network nodes 110 and the UEs 120 of the wireless communication network 100 may be configured for full-duplex operation in addition to half-duplex operation. A network node 110 or a UE 120 operating in a half-duplex mode may perform only one of transmission or reception during particular time resources, such as during particular slots, symbols, or other time periods. Half-duplex operation may involve time-division duplexing (TDD), in which DL transmissions of the network node 110 and UL transmissions of the UE 120 do not occur in the same time resources (that is, the transmissions do not overlap in time). In contrast, a network node 110 or a UE 120 operating in a full-duplex mode can transmit and receive communications concurrently (for example, in the same time resources). By operating in a full-duplex mode, network nodes 110 and/or UEs 120 may generally increase the capacity of the network and the radio access link. In some examples, full-duplex operation may involve frequency-division duplexing (FDD), in which DL transmissions of the network node 110 are performed in a first frequency band or on a first component carrier and transmissions of the UE 120 are performed in a second frequency band or on a second component carrier different than the first frequency band or the first component carrier, respectively. In some examples, full-duplex operation may be enabled for a UE 120 but not for a network node 110. For example, a UE 120 may simultaneously transmit an UL transmission to a first network node 110 and receive a DL transmission from a second network node 110 in the same time resources. In some other examples, full-duplex operation may be enabled for a network node 110 but not for a UE 120. For example, a network node 110 may simultaneously transmit a DL transmission to a first UE 120 and receive an UL transmission from a second UE 120 in the same time resources. In some other examples, full-duplex operation may be enabled for both a network node 110 and a UE 120.

In some examples, the UEs 120 and the network nodes 110 may perform MIMO communication. "MIMO" generally refers to transmitting or receiving multiple signals (such as multiple layers or multiple data streams) simultaneously over the same time and frequency resources. MIMO techniques generally exploit multipath propagation. MIMO may be implemented using various spatial processing or spatial multiplexing operations. In some examples, MIMO may support simultaneous transmission to multiple receivers, referred to as multi-user MIMO (MU-MIMO). Some RATs may employ advanced MIMO techniques, such as mTRP operation (including redundant transmission or reception on multiple TRPs), reciprocity in the time domain or the frequency domain, single-frequency-network (SFN) transmission, or non-coherent joint transmission (NC-JT).

In some aspects, the UE 120 may include a communication manager 140. As described in more detail elsewhere herein, the communication manager 140 may receive, from a network node 110, a downlink grant scheduling a PDSCH transmission that includes a TB associated with a first HARQ-ACK feedback occasion and a second HARQ-ACK feedback occasion, wherein the downlink grant schedules at least the first HARQ-ACK feedback occasion associated with the TB associated with the TB; and transmit, to the network node 110, HARQ feedback for the TB in one or more of the first HARQ-ACK feedback occasion or the second HARQ-ACK feedback occasion associated with the TB. Additionally, or alternatively, the communication manager 140 may perform one or more other operations described herein.

In some aspects, the network node 110 may include a communication manager 150. As described in more detail elsewhere herein, the communication manager 150 may transmit, to a UE 120, a downlink grant scheduling a PDSCH transmission that includes a TB associated with a first HARQ-ACK feedback occasion and a second HARQ-ACK feedback occasion, wherein the downlink grant schedules at least the first HARQ-ACK feedback occasion associated with the TB associated with the TB; and receive, from the UE 120, HARQ feedback for the TB in one or more of the first HARQ-ACK feedback occasion or the second HARQ-ACK feedback occasion associated with the TB.

Additionally, or alternatively, the communication manager 150 may perform one or more other operations described herein.

As indicated above, FIG. 1 is provided as an example. Other examples may differ from what is described with regard to FIG. 1.

Figure 2:
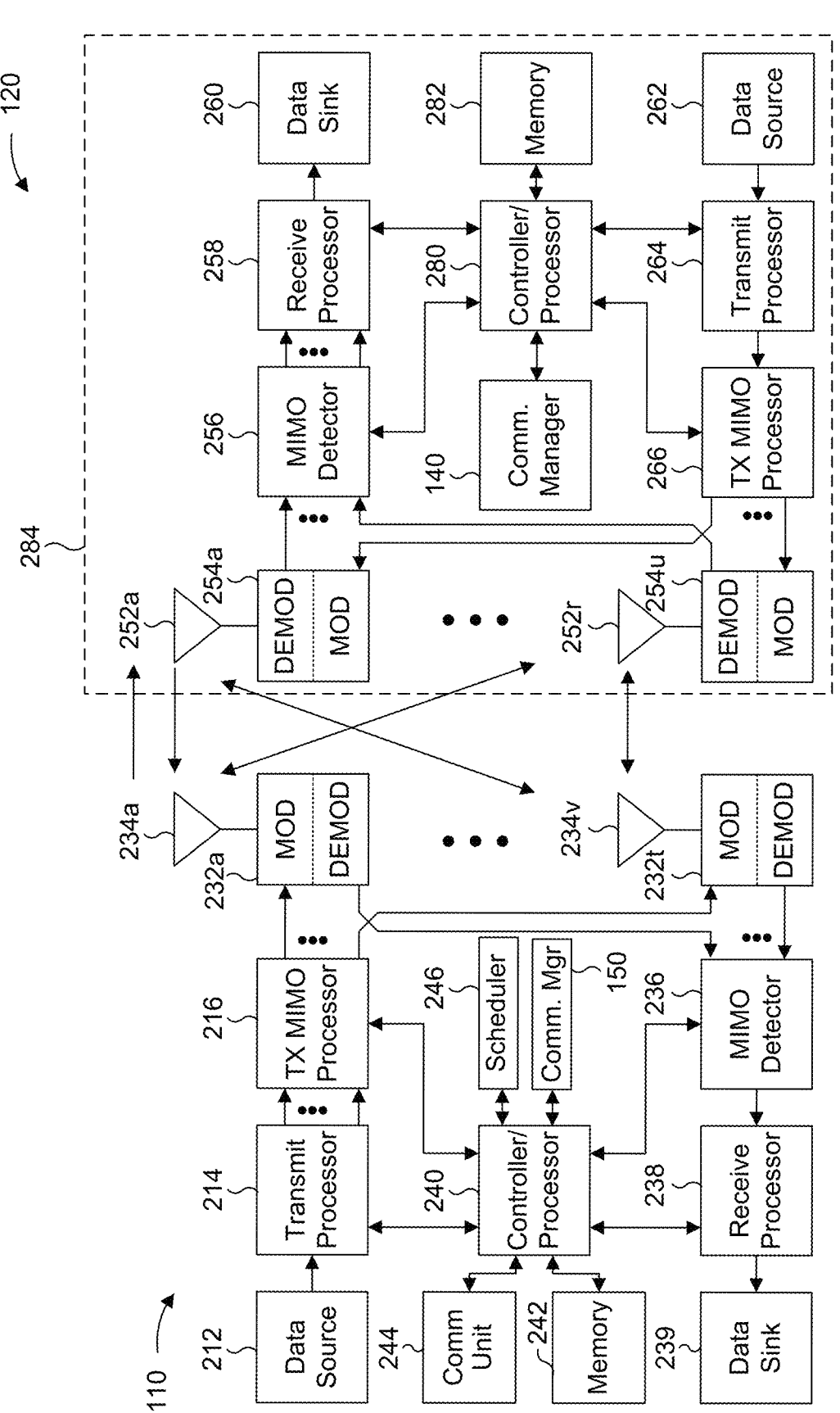
FIG. 2 is a diagram illustrating an example network node in communication with a user equipment (UE) in a wireless network in accordance with the present disclosure.

FIG. 2 is a diagram illustrating an example network node 110 in communication with an example UE 120 in a wireless network in accordance with the present disclosure.

As shown in FIG. 2, the network node 110 may include a data source 212, a transmit processor 214, a transmit (TX) MIMO processor 216, a set of modems 232 (shown as 232a through 232t, where t≥1), a set of antennas 234 (shown as 234a through 234v, where v≥1), a MIMO detector 236, a receive processor 238, a data sink 239, a controller/processor 240, a memory 242, a communication unit 244, a scheduler 246, and/or a communication manager 150, among other examples. In some configurations, one or a combination of the antenna(s) 234, the modem(s) 232, the MIMO detector 236, the receive processor 238, the transmit processor 214, and/or the TX MIMO processor 216 may be included in a transceiver of the network node 110. The transceiver may be under control of and used by one or more processors, such as the controller/processor 240, and in some aspects in conjunction with processor-readable code stored in the memory 242, to perform aspects of the methods, processes, and/or operations described herein. In some aspects, the network node 110 may include one or more interfaces, communication components, and/or other components that facilitate communication with the UE 120 or another network node.

The terms "processor," "controller," or "controller/processor" may refer to one or more controllers and/or one or more processors. For example, reference to "a/the processor," "a/the controller/processor," or the like (in the singular) should be understood to refer to any one or more of the processors described in connection with FIG. 2, such as a single processor or a combination of multiple different processors. Reference to "one or more processors" should be understood to refer to any one or more of the processors described in connection with FIG. 2. For example, one or more processors of the network node 110 may include transmit processor 214, TX MIMO processor 216, MIMO detector 236, receive processor 238, and/or controller/processor 240. Similarly, one or more processors of the UE 120 may include MIMO detector 256, receive processor 258, transmit processor 264, TX MIMO processor 266, and/or controller/processor 280.

In some aspects, a single processor may perform all of the operations described as being performed by the one or more processors. In some aspects, a first set of (one or more) processors of the one or more processors may perform a first operation described as being performed by the one or more processors, and a second set of (one or more) processors of the one or more processors may perform a second operation described as being performed by the one or more processors. The first set of processors and the second set of processors may be the same set of processors or may be different sets of processors. Reference to "one or more memories" should be understood to refer to any one or more memories of a corresponding device, such as the memory described in connection with FIG. 2. For example, operation described as being performed by one or more memories can be performed by the same subset of the one or more memories or different subsets of the one or more memories.

For downlink communication from the network node 110 to the UE 120, the transmit processor 214 may receive data ("downlink data") intended for the UE 120 (or a set of UEs that includes the UE 120) from the data source 212 (such as a data pipeline or a data queue). In some examples, the transmit processor 214 may select one or more MCSs for the UE 120 in accordance with one or more channel quality indicators (CQIs) received from the UE 120. The network node 110 may process the data (for example, including encoding the data) for transmission to the UE 120 on a downlink in accordance with the MCS(s) selected for the UE 120 to generate data symbols. The transmit processor 214 may process system information (for example, semi-static resource partitioning information (SRPI)) and/or control information (for example, CQI requests, grants, and/or upper layer signaling) and provide overhead symbols and/or control symbols. The transmit processor 214 may generate reference symbols for reference signals (for example, a cell-specific reference signal (CRS), a demodulation reference signal (DMRS), or a channel state information (CSI) reference signal (CSI-RS)) and/or synchronization signals (for example, a primary synchronization signal (PSS) or a secondary synchronization signals (SSS)).

The TX MIMO processor 216 may perform spatial processing (for example, precoding) on the data symbols, the control symbols, the overhead symbols, and/or the reference symbols, if applicable, and may provide a set of output symbol streams (for example, T output symbol streams) to the set of modems 232. For example, each output symbol stream may be provided to a respective modulator component (shown as MOD) of a modem 232. Each modem 232 may use the respective modulator component to process (for example, to modulate) a respective output symbol stream (for example, for orthogonal frequency division multiplexing (OFDM)) to obtain an output sample stream. Each modem 232 may further use the respective modulator component to process (for example, convert to analog, amplify, filter, and/or upconvert) the output sample stream to obtain a time domain downlink signal. The modems 232a through 232t may together transmit a set of downlink signals (for example, T downlink signals) via the corresponding set of antennas 234.

A downlink signal may include a DCI communication, a MAC control element (MAC-CE) communication, an RRC communication, a downlink reference signal, or another type of downlink communication. Downlink signals may be transmitted on a PDCCH, a PDSCH, and/or on another downlink channel. A downlink signal may carry one or more TBs of data. A TB may be a unit of data that is transmitted over an air interface in the wireless communication network 100. A data stream (for example, from the data source 212) may be encoded into multiple TBs for transmission over the air interface. The quantity of TBs used to carry the data associated with a particular data stream may be associated with a TB size common to the multiple TBs. The TB size may be based on or otherwise associated with radio channel conditions of the air interface, the MCS used for encoding the data, the downlink resources allocated for transmitting the data, and/or another parameter. In general, the larger the TB size, the greater the amount of data that can be transmitted in a single transmission, which reduces signaling overhead. However, larger TB sizes may be more prone to transmission and/or reception errors than smaller TB sizes, but such errors may be mitigated by more robust error correction techniques.

For uplink communication from the UE 120 to the network node 110, uplink signals from the UE 120 may be received by an antenna 234, may be processed by a modem 232 (for example, a demodulator component, shown as DEMOD, of a modem 232), may be detected by the MIMO detector 236 (for example, a receive (Rx) MIMO processor) if applicable, and/or may be further processed by the receive processor 238 to obtain decoded data and/or control information. The receive processor 238 may provide the decoded data to a data sink 239 (which may be a data pipeline, a data queue, and/or another type of data sink) and provide the decoded control information to a processor, such as the controller/processor 240.

The network node 110 may use the scheduler 246 to schedule one or more UEs 120 for downlink or uplink communications. In some aspects, the scheduler 246 may use DCI to dynamically schedule DL transmissions to the UE 120 and/or UL transmissions from the UE 120. In some examples, the scheduler 246 may allocate recurring time domain resources and/or frequency domain resources that the UE 120 may use to transmit and/or receive communications using an RRC configuration (for example, a semi-static configuration), for example, to perform semi-persistent scheduling (SPS) or to configure a configured grant (CG) for the UE 120.

One or more of the transmit processor 214, the TX MIMO processor 216, the modem 232, the antenna 234, the MIMO detector 236, the receive processor 238, and/or the controller/processor 240 may be included in an RF chain of the network node 110. An RF chain may include one or more filters, mixers, oscillators, amplifiers, analog-to-digital converters (ADCs), and/or other devices that convert between an analog signal (such as for transmission or reception via an air interface) and a digital signal (such as for processing by one or more processors of the network node 110). In some aspects, the RF chain may be or may be included in a transceiver of the network node 110.

In some examples, the network node 110 may use the communication unit 244 to communicate with a core network and/or with other network nodes. The communication unit 244 may support wired and/or wireless communication protocols and/or connections, such as Ethernet, optical fiber, common public radio interface (CPRI), and/or a wired or wireless backhaul, among other examples. The network node 110 may use the communication unit 244 to transmit and/or receive data associated with the UE 120 or to perform network control signaling, among other examples. The communication unit 244 may include a transceiver and/or an interface, such as a network interface.

The UE 120 may include a set of antennas 252 (shown as antennas 252a through 252r, where r≥1), a set of modems 254 (shown as modems 254a through 254u, where u≥1), a MIMO detector 256, a receive processor 258, a data sink 260, a data source 262, a transmit processor 264, a TX MIMO processor 266, a controller/processor 280, a memory 282, and/or a communication manager 140, among other examples. One or more of the components of the UE 120 may be included in a housing 284. In some aspects, one or a combination of the antenna(s) 252, the modem(s) 254, the MIMO detector 256, the receive processor 258, the transmit processor 264, or the TX MIMO processor 266 may be included in a transceiver that is included in the UE 120. The transceiver may be under control of and used by one or more processors, such as the controller/processor 280, and in some aspects in conjunction with processor-readable code stored in the memory 282, to perform aspects of the methods, processes, or operations described herein. In some aspects, the UE 120 may include another interface, another communication component, and/or another component that facilitates communication with the network node 110 and/or another UE 120.

For downlink communication from the network node 110 to the UE 120, the set of antennas 252 may receive the downlink communications or signals from the network node 110 and may provide a set of received downlink signals (for example, R received signals) to the set of modems 254. For example, each received signal may be provided to a respective demodulator component (shown as DEMOD) of a modem 254. Each modem 254 may use the respective demodulator component to condition (for example, filter, amplify, downconvert, and/or digitize) a received signal to obtain input samples. Each modem 254 may use the respective demodulator component to further demodulate or process the input samples (for example, for OFDM) to obtain received symbols. The MIMO detector 256 may obtain received symbols from the set of modems 254, may perform MIMO detection on the received symbols if applicable, and may provide detected symbols. The receive processor 258 may process (for example, decode) the detected symbols, may provide decoded data for the UE 120 to the data sink 260 (which may include a data pipeline, a data queue, and/or an application executed on the UE 120), and may provide decoded control information and system information to the controller/processor 280.

For uplink communication from the UE 120 to the network node 110, the transmit processor 264 may receive and process data ("uplink data") from a data source 262 (such as a data pipeline, a data queue, and/or an application executed on the UE 120) and control information from the controller/processor 280. The control information may include one or more parameters, feedback, one or more signal measurements, and/or other types of control information. In some aspects, the receive processor 258 and/or the controller/processor 280 may determine, for a received signal (such as received from the network node 110 or another UE), one or more parameters relating to transmission of the uplink communication. The one or more parameters may include a reference signal received power (RSRP) parameter, a received signal strength indicator (RSSI) parameter, a reference signal received quality (RSRQ) parameter, a CQI parameter, or a transmit power control (TPC) parameter, among other examples. The control information may include an indication of the RSRP parameter, the RSSI parameter, the RSRQ parameter, the CQI parameter, the TPC parameter, and/or another parameter. The control information may facilitate parameter selection and/or scheduling for the UE 120 by the network node 110.

The transmit processor 264 may generate reference symbols for one or more reference signals, such as an uplink DMRS, an uplink sounding reference signal (SRS), and/or another type of reference signal. The symbols from the transmit processor 264 may be precoded by the TX MIMO processor 266, if applicable, and further processed by the set of modems 254 (for example, for DFT-s-OFDM or CP-OFDM). The TX MIMO processor 266 may perform spatial processing (for example, precoding) on the data symbols, the control symbols, the overhead symbols, and/or the reference symbols, if applicable, and may provide a set of output symbol streams (for example, U output symbol streams) to the set of modems 254. For example, each output symbol stream may be provided to a respective modulator component (shown as MOD) of a modem 254. Each modem 254 may use the respective modulator component to process (for example, to modulate) a respective output symbol stream (for example, for OFDM) to obtain an output sample stream. Each modem 254 may further use the respective modulator component to process (for example, convert to analog, amplify, filter, and/or upconvert) the output sample stream to obtain an uplink signal.

The modems 254*a* through 254*u* may transmit a set of uplink signals (for example, R uplink signals or U uplink symbols) via the corresponding set of antennas 252. An uplink signal may include a UCI communication, a MAC-CE communication, an RRC communication, or another type of uplink communication. Uplink signals may be transmitted on a PUSCH, a PUCCH, and/or another type of uplink channel. An uplink signal may carry one or more TBs of data. Sidelink data and control transmissions (that is, transmissions directly between two or more UEs 120) may generally use similar techniques as were described for uplink data and control transmission, and may use sidelink-specific channels such as a physical sidelink shared channel (PSSCH), a physical sidelink control channel (PSCCH), and/or a physical sidelink feedback channel (PSFCH).

One or more antennas of the set of antennas 252 or the set of antennas 234 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 2. As used herein, "antenna" can refer to one or more antennas, one or more antenna panels, one or more antenna groups, one or more sets of antenna elements, or one or more antenna arrays. "Antenna panel" can refer to a group of antennas (such as antenna elements) arranged in an array or panel, which may facilitate beamforming by manipulating parameters of the group of antennas. "Antenna module" may refer to circuitry including one or more antennas, which may also include one or more other components (such as filters, amplifiers, or processors) associated with integrating the antenna module into a wireless communication device.

In some examples, each of the antenna elements of an antenna 234 or an antenna 252 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, and/or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (such as to form a desired beam). For example, given an expected range of wavelengths or frequencies, the spacing may provide a quarter wavelength, a half wavelength, or another fraction of a wavelength of spacing between neighboring antenna elements to allow for the desired constructive and destructive interference patterns of signals transmitted by the separate antenna elements within that expected range.

The amplitudes and/or phases of signals transmitted via antenna elements and/or sub-elements may be modulated and shifted relative to each other (such as by manipulating phase shift, phase offset, and/or amplitude) to generate one or more beams, which is referred to as beamforming. The term "beam" may refer to a directional transmission of a wireless signal toward a receiving device or otherwise in a desired direction. "Beam" may also generally refer to a direction associated with such a directional signal transmission, a set of directional resources associated with the signal transmission (for example, an angle of arrival, a horizontal direction, and/or a vertical direction), and/or a set of parameters that indicate one or more aspects of a directional signal, a direction associated with the signal, and/or a set of directional resources associated with the signal. In some implementations, antenna elements may be individually selected or deselected for directional transmission of a signal (or signals) by controlling amplitudes of one or more corresponding amplifiers and/or phases of the signal(s) to form one or more beams. The shape of a beam (such as the amplitude, width, and/or presence of side lobes) and/or the direction of a beam (such as an angle of the beam relative to a surface of an antenna array) can be dynamically controlled by modifying the phase shifts, phase offsets, and/or amplitudes of the multiple signals relative to each other.

Different UEs 120 or network nodes 110 may include different numbers of antenna elements. For example, a UE 120 may include a single antenna element, two antenna elements, four antenna elements, eight antenna elements, or a different number of antenna elements. As another example, a network node 110 may include eight antenna elements, 24 antenna elements, 64 antenna elements, 128 antenna elements, or a different number of antenna elements. Generally, a larger number of antenna elements may provide increased control over parameters for beam generation relative to a smaller number of antenna elements, whereas a smaller number of antenna elements may be less complex to implement and may use less power than a larger number of antenna elements. Multiple antenna elements may support multiple-layer transmission, in which a first layer of a communication (which may include a first data stream) and a second layer of a communication (which may include a second data stream) are transmitted using the same time and frequency resources with spatial multiplexing.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

Figure 3:
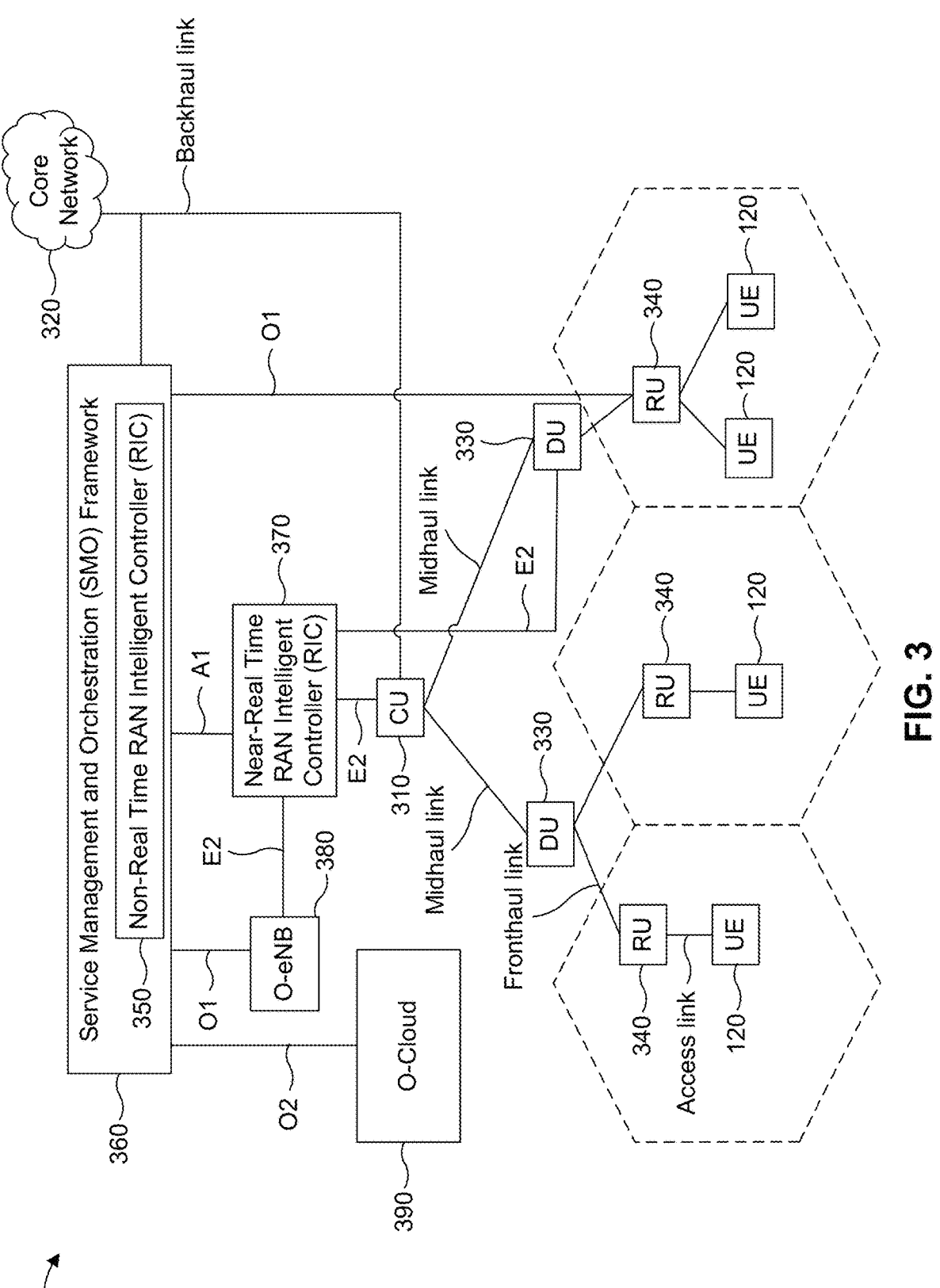
FIG. 3 is a diagram illustrating an example disaggregated base station architecture in accordance with the present disclosure.

FIG. 3 is a diagram illustrating an example disaggregated base station architecture 300 in accordance with the present disclosure. One or more components of the example disaggregated base station architecture 300 may be, may include, or may be included in one or more network nodes (such one or more network nodes 110). The disaggregated base station architecture 300 may include a CU 310 that can communicate directly with a core network 320 via a backhaul link, or that can communicate indirectly with the core network 320 via one or more disaggregated control units, such as a Non-RT RIC 350 associated with a Service Management and Orchestration (SMO) Framework 360 and/or a Near-RT RIC 370 (for example, via an E2 link). The CU 310 may communicate with one or more DUs 330 via respective midhaul links, such as via F1 interfaces. Each of the DUs 330 may communicate with one or more RUs 340 via respective fronthaul links. Each of the RUs 340 may communicate with one or more UEs 120 via respective RF access links. In some deployments, a UE 120 may be simultaneously served by multiple RUs 340.

Each of the components of the disaggregated base station architecture 300, including the CUS 310, the DUs 330, the RUs 340, the Near-RT RICs 370, the Non-RT RICs 350, and the SMO Framework 360, may include one or more interfaces or may be coupled with one or more interfaces for receiving or transmitting signals, such as data or information, via a wired or wireless transmission medium.

In some aspects, the CU 310 may be logically split into one or more CU-UP units and one or more CU-CP units. A CU-UP unit may communicate bidirectionally with a CU-CP unit via an interface, such as the E1 interface when implemented in an O-RAN configuration. The CU 310 may be deployed to communicate with one or more DUs 330, as necessary, for network control and signaling. Each DU 330 may correspond to a logical unit that includes one or more base station functions to control the operation of one or more RUs 340. For example, a DU 330 may host various layers, such as an RLC layer, a MAC layer, or one or more PHY layers, such as one or more high PHY layers or one or more low PHY layers. Each layer (which also may be referred to as a module) may be implemented with an interface for communicating signals with other layers (and modules) hosted by the DU 330, or for communicating signals with the control functions hosted by the CU 310. Each RU 340 may implement lower layer functionality. In some aspects, real-time and non-real-time aspects of control and user plane communication with the RU(s) 340 may be controlled by the corresponding DU 330.

The SMO Framework 360 may support RAN deployment and provisioning of non-virtualized and virtualized network elements. For non-virtualized network elements, the SMO Framework 360 may support the deployment of dedicated physical resources for RAN coverage requirements, which may be managed via an operations and maintenance interface, such as an O1 interface. For virtualized network elements, the SMO Framework 360 may interact with a cloud computing platform (such as an open cloud (O-Cloud) platform 390) to perform network element life cycle management (such as to instantiate virtualized network elements) via a cloud computing platform interface, such as an O2 interface. A virtualized network element may include, but is not limited to, a CU 310, a DU 330, an RU 340, a non-RT RIC 350, and/or a Near-RT RIC 370. In some aspects, the SMO Framework 360 may communicate with a hardware aspect of a 4G RAN, a 5G NR RAN, and/or a 6G RAN, such as an open eNB (O-eNB) 380, via an O1 interface. Additionally or alternatively, the SMO Framework 360 may communicate directly with each of one or more RUs 340 via a respective O1 interface. In some deployments, this configuration can enable each DU 330 and the CU 310 to be implemented in a cloud-based RAN architecture, such as a vRAN architecture.

The Non-RT RIC 350 may include or may implement a logical function that enables non-real-time control and optimization of RAN elements and resources, AI/ML workflows including model training and updates, and/or policy-based guidance of applications and/or features in the Near-RT RIC 370. The Non-RT RIC 350 may be coupled to or may communicate with (such as via an A1 interface) the Near-RT RIC 370. The Near-RT RIC 370 may include or may implement a logical function that enables near-real-time control and optimization of RAN elements and resources via data collection and actions via an interface (such as via an E2 interface) connecting one or more CUs 310, one or more DUs 330, and/or an O-eNB with the Near-RT RIC 370.

In some aspects, to generate AI/ML models to be deployed in the Near-RT RIC 370, the Non-RT RIC 350 may receive parameters or external enrichment information from external servers. Such information may be utilized by the Near-RT RIC 370 and may be received at the SMO Framework 360 or the Non-RT RIC 350 from non-network data sources or from network functions. In some examples, the Non-RT RIC 350 or the Near-RT RIC 370 may tune RAN behavior or performance. For example, the Non-RT RIC 350 may monitor long-term trends and patterns for performance and may employ AI/ML models to perform corrective actions via the SMO Framework 360 (such as reconfiguration via an O1 interface) or via creation of RAN management policies (such as A1 interface policies).

As indicated above, FIG. 3 is provided as an example. Other examples may differ from what is described with regard to FIG. 3.

The network node 110, the controller/processor 240 of the network node 110, the UE 120, the controller/processor 280 of the UE 120, the CU 310, the DU 330, the RU 340, or any other component(s) of FIG. 1, 2, or 3 may implement one or more techniques or perform one or more operations associated with HARQ feedback for high throughput use cases, as described in more detail elsewhere herein. For example, the controller/processor 240 of the network node 110, the controller/processor 280 of the UE 120, any other component(s) of FIG. 2, the CU 310, the DU 330, or the RU 340 may perform or direct operations of, for example, process 600 of FIG. 6, process 700 of FIG. 7, or other processes as described herein (alone or in conjunction with one or more other processors). The memory 242 may store data and program codes for the network node 110, the network node 110, the CU 310, the DU 330, or the RU 340. The memory 282 may store data and program codes for the UE 120. In some examples, the memory 242 or the memory 282 may include a non-transitory computer-readable medium storing a set of instructions (for example, code or program code) for wireless communication. The memory 242 may include one or more memories, such as a single memory or multiple different memories (of the same type or of different types). The memory 282 may include one or more memories, such as a single memory or multiple different memories (of the same type or of different types). For example, the set of instructions, when executed (for example, directly, or after compiling, converting, or interpreting) by one or more processors of the network node 110, the UE 120, the CU 310, the DU 330, or the RU 340, may cause the one or more processors to perform process 600 of FIG. 6, process 700 of FIG. 7, or other processes as described herein. In some examples, executing instructions may include running the instructions, converting the instructions, compiling the instructions, and/or interpreting the instructions, among other examples.

In some aspects, the UE 120 includes means for receiving, from a network node 110, a downlink grant scheduling a PDSCH transmission that includes a TB associated with a first HARQ-ACK feedback occasion and a second HARQ-ACK feedback occasion, wherein the downlink grant schedules at least the first HARQ-ACK feedback occasion associated with the TB associated with the TB; and/or means for transmitting, to the network node 110, HARQ feedback for the TB in one or more of the first HARQ-ACK feedback occasion or the second HARQ-ACK feedback occasion associated with the TB. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for transmitting, to a UE 120, a downlink grant scheduling a PDSCH transmission that includes a TB associated with a first HARQ-ACK feedback occasion and a second HARQ-ACK feedback occasion, wherein the downlink grant schedules at least the first HARQ-ACK feedback occasion associated with the TB associated with the TB; and/or means for receiving, from the UE 120, HARQ feedback for the TB in one or more of the first HARQ-ACK feedback occasion or the second HARQ-ACK feedback occasion associated with the TB. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

Figure 4:
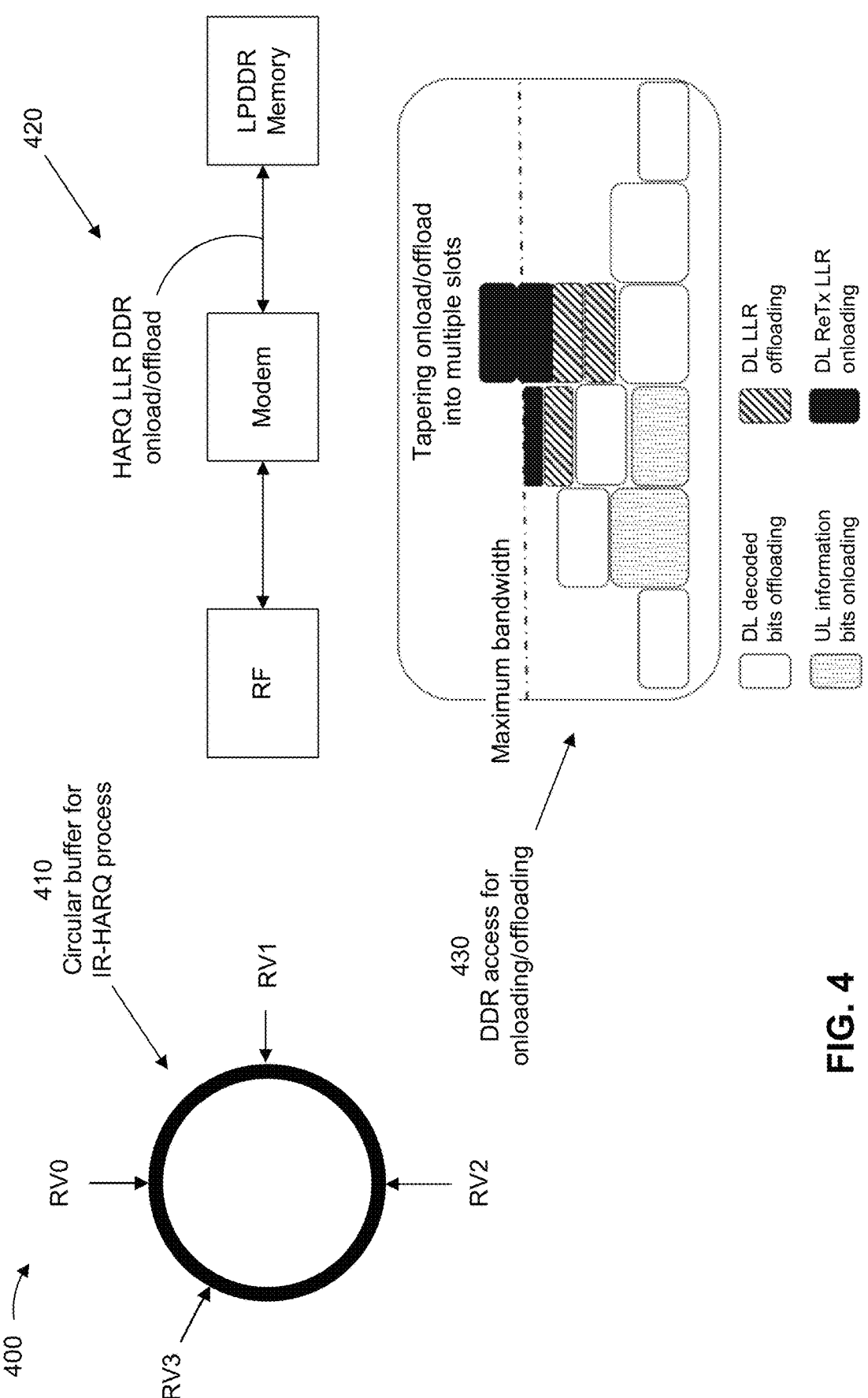
FIG. 4 is a diagram illustrating an example of double data rate congestion that may be caused by hybrid automatic repeat request (HARQ) log likelihood ratio onloading and/or offloading in high throughput use cases in accordance with the present disclosure.

FIG. 4 is a diagram illustrating an example 400 of DDR congestion that may be caused by HARQ LLR onloading and/or offloading in high throughput use cases in accordance with the present disclosure.

More particularly, HARQ includes a combination of FEC and ARQ error-control. In ARQ, a transmitter may add redundant bits to a message to be transmitted using an error-detecting code, such as a CRC and parity bits, and a receiver that fails to correctly decode the message (e.g., based on the CRC) may request a retransmission of the message from the transmitter. In HARQ, the original data may be encoded with an FEC code, and parity bits may be sent along with the message or transmitted upon request from the receiver in connection with the receiver detecting a failure to correctly decode the message. In HARQ, the receiver may store information from an incorrectly decoded TB in a HARQ buffer, and when the receiver receives a retransmission of the TB, the receiver may perform soft combining to combine the information stored in the HARQ buffer with information from the retransmitted TB in an attempt to decode the combined information. For example, the receiver may use LLR soft combining to combine multiple transmissions of a message. In this case, the receiver may store, in the HARQ buffer, LLR values for the demodulator output for a transmission of a message (e.g., a respective LLR value for each bit in the received message), and may then combine the stored LLR values with LLR values for the demodulator output for a retransmission of the message prior to decoding the combined LLR values.

IR-HARQ is a HARQ technique in which multiple sets of coded bits may be generated, each representing the same set of information bits. In this case, a retransmission may use a different set of coded bits from a previous transmission, with different redundancy versions (RVs) generated by puncturing the encoder output. For example, as described herein, an RV determines which bits are selected for transmission, where each RV is constructed from the bits in a circular buffer, whereby different RVs will result in different sets of bits being transmitted. In this way, IR-HARQ may provide robustness against inaccurate rate control, bursty interference, fading channels, or other issues that may reduce reliability of a data channel in addition to improving coverage and spectral efficiency. For example, as shown by reference number 410, a receiver (e.g., a UE 120) may support IR-HARQ by performing rate matching of LDPC codes using a circular buffer. The circular buffer may be filled with an ordered sequence of systematic bits and parity bits. As shown by reference number 410, for IR-HARQ, each RV, RVi (e.g., shown as RV0, RV1, RV2, and RV3 in FIG. 4), may be assigned to a starting bit location Si on the circular buffer. For IR retransmission of RVi, the coded bits are read out sequentially from the circular buffer, starting with the bit location Si. In some examples, limited buffer rate matching (LBRM) may be supported. In a case in which LBRM is configured, a UE 120 may only need to store $3/2\times M$ information bits for each TB, instead of $3\times M$ information bits for each TB (e.g., for LDPC with Base graph 1) or $5\times M$ information bits for each TB (e.g., for LDPC with Base graph 2).

However, the benefits associated with IR-HARQ come at a cost, in that a receiver generally requires a large amount of memory to store the HARQ LLRs that are used to enable soft combining for a large number of HARQ processes. In general, approaches to mitigate the large memory requirements associated with IR-HARQ have focused on attempting to minimize a soft buffer memory footprint. However, minimizing the soft buffer memory footprint may be insufficient for high throughput use cases. For example, as wireless communication technologies evolve to support very high throughputs, the memory size that is available for IR-HARQ needs to scale with the increased throughput in order to store the HARQ LLRs used for soft combining (e.g., 20 megabytes of memory may be needed to store the HARQ LLRs for a throughput of 10 Gbps), and the memory requirements increase linearly with the throughput).

Accordingly, IR-HARQ designs are experiencing a paradigm shift based on a change to modem architectures, where storage of HARQ LLRs is increasingly offloaded to DDR memory. For example, as shown by reference number 420 in FIG. 4, a UE that supports DDR offloading/onloading to enable IR-HARQ may include an RF component, a modem (e.g., a cellular modem), and external memory (e.g., shown as LPDDR memory in FIG. 4). In such an architecture, the HARQ LLRs that are used to enable soft combining are not entirely stored inside the modem (e.g., in a HARQ buffer or Layer (2) buffer). Instead, storage of the HARQ LLRs is at least partially offloaded to the external memory. As a result, rather than the HARQ soft buffer size, DDR bandwidth (e.g., a rate at which data is transferred between the modem and the DDR memory) may become a bottleneck to IR-HARQ performance due to the offloading of HARQ LLR storage to DDR memory. However, increasing the DDR bandwidth poses various challenges, including that DDR memories with a bandwidth that supports multiple hundreds of Gbps may be needed to support a 50 Gbps throughput without throttling, which increases costs because the UE would need multiple LPDDR memories to support the increased DDR bandwidth. In other words, although the use of DDR memory to store the HARQ LLRs can mitigate the issue of the large memory size needed to support IR-HARQ for high throughput use cases, the speed of the interface between the modem and the external memory limits the maximum throughput (e.g., due to the need to send information from the modem to the external memory and from the external memory to the modem).

Accordingly, various aspects described herein generally relate to techniques that may be used to maintain the benefits of IR-HARQ for high throughput use cases while limiting or avoiding a need to increase a DDR bandwidth. For example, as shown in FIG. 4, and by reference number 430 herein, IR-HARQ operation may generally require four different DDR access types. In particular, as shown in FIG. 4, the modem may need to access the DDR memory to offload storage of successfully decoded downlink information bits (e.g., shown in FIG. 4 by boxes with a white fill), to offload storage of LLRs for downlink decoding failures (e.g., shown in FIG. 4 by boxes with a diagonal fill), to onload storage of uplink information bits to be transmitted (e.g., shown in FIG. 4 by boxes with a dotted fill), and to onload storage of downlink retransmission LLRs (e.g., shown in FIG. 4 by boxes with a black fill). In general, when DDR offloading and onloading is enabled for HARQ operation, offloading the storage of the successfully decoded downlink information bits and onloading storage of the uplink information bits to be transmitted cannot be delayed, because an uplink and downlink data rate would otherwise be unsustainable. However, offloading storage of LLRs for downlink decoding failures and onloading storage of downlink retransmission LLRs can be tapered down to postpone or slow down DDR access when a DDR bandwidth limit is reached. However, when the DDR bandwidth limit is reached, postponing or slowing DDR access may cause a delay to HARQ operations (e.g., soft combining). For example, in FIG. 4, the horizontal dashed and dotted line represents the maximum DDR bandwidth, where there is no DDR congestion when the utilized DDR bandwidth is below the maximum DDR bandwidth. However, in cases where the UE needs to access the DDR memory with a bandwidth that exceeds the maximum DDR bandwidth, the UE needs to reduce the DDR access (e.g., by tapering or postponing access for tasks to offload storage of HARQ LLRs for downlink decoding failures or onload downlink retransmission LLRs until later slots or symbols).

Figure 5A:
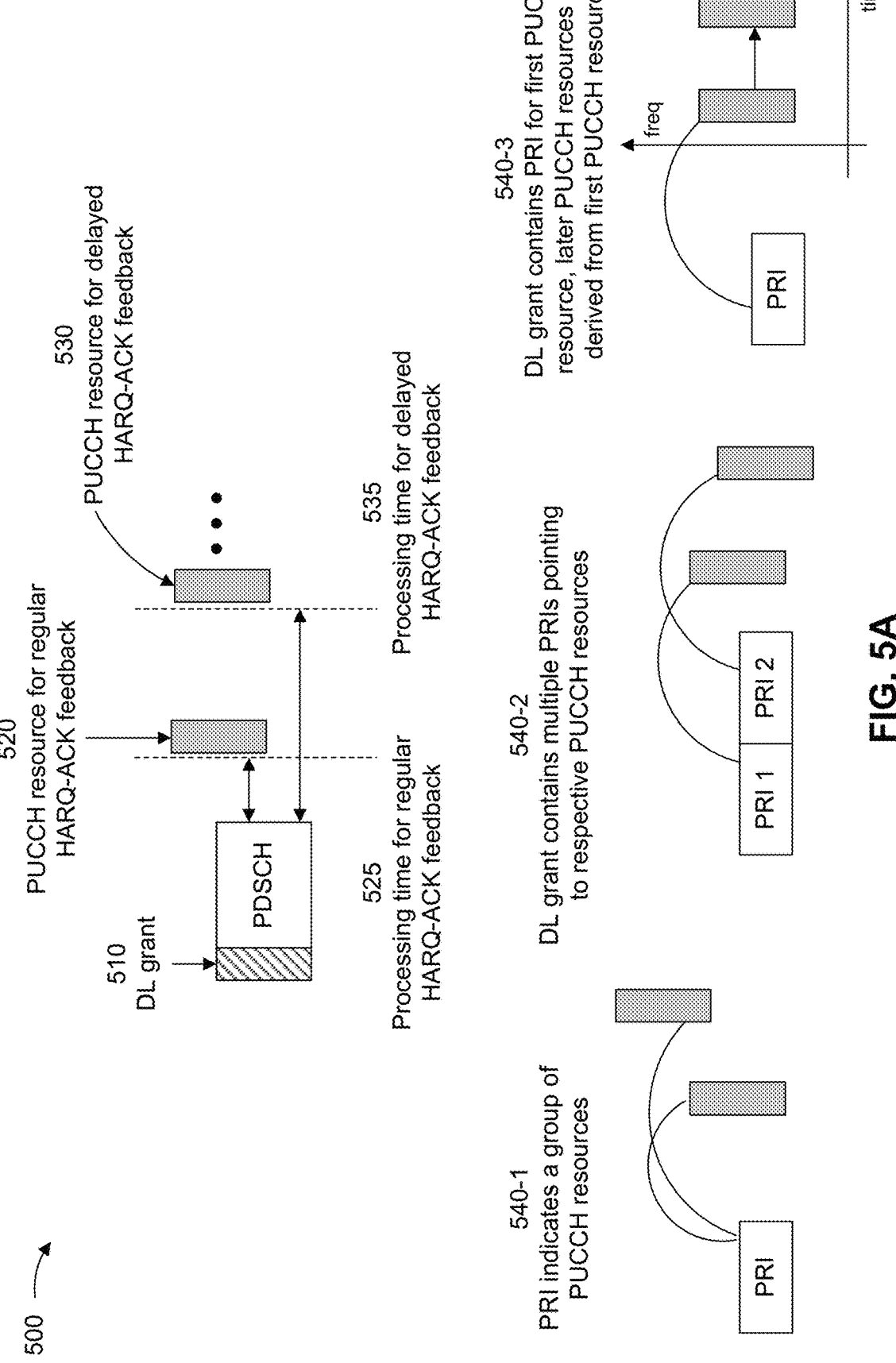
FIGS. 5A-5B are diagrams illustrating examples associated with HARQ feedback for high throughput use cases in accordance with the present disclosure.
Figure 5B:
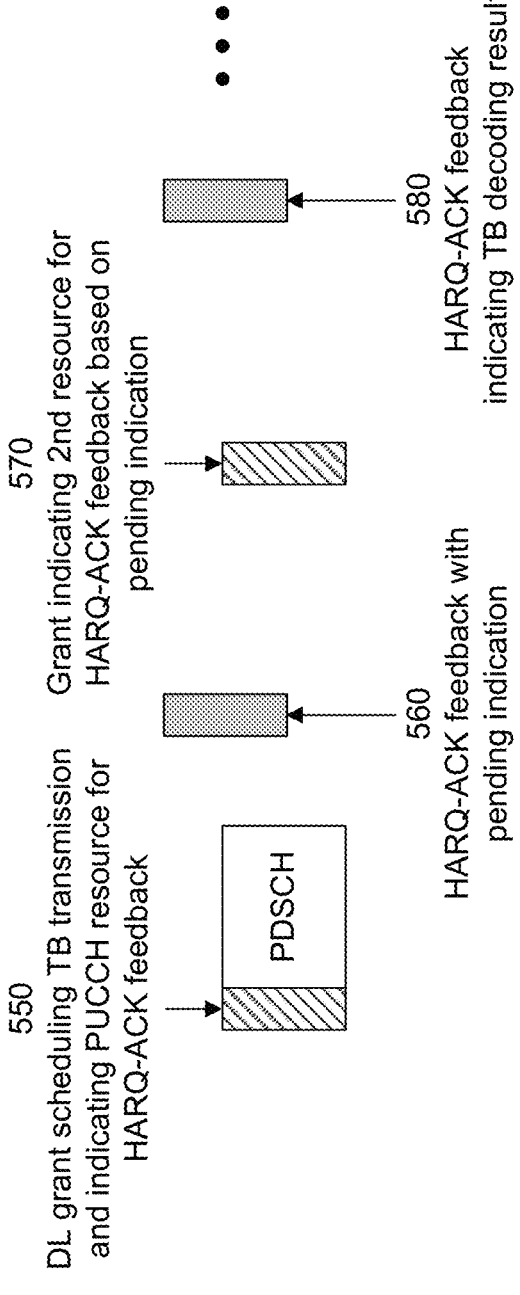

Accordingly, as described in further detail herein with reference to FIGS. 5A-5B, some aspects relate to a HARQ design that can support high throughput use cases where HARQ operations may potentially be delayed. For example, in some aspects, a PDSCH transmission that carries a TB may be associated with multiple HARQ-ACK feedback occasions at different times (e.g., in different slots or symbols), where an initial HARQ-ACK feedback occasion may be associated with a regular HARQ-ACK timeline (e.g., corresponding to an N1 parameter, or PDSCH processing time). Accordingly, in cases where the UE is able to decode the TB before the initial HARQ-ACK feedback occasion without experiencing DDR issues or other delays to HARQ operation, the UE may use the initial HARQ-ACK feedback occasion to transmit an ACK or a NACK for the PDSCH transmission. Furthermore, the multiple HARQ-ACK feedback occasions may include one or more HARQ-ACK feedback occasions that are later in time relative to the initial HARQ-ACK feedback occasion, whereby the UE may spend more time decoding the TB and use the later HARQ-ACK feedback occasion(s) to transmit ACK/NACK feedback in cases where a slower DDR onloading or offloading or other issues delay HARQ operation. Furthermore, some aspects described herein relate to UE behavior in the later HARQ-ACK feedback occasion(s) when an ACK is transmitted in an earlier HARQ-ACK feedback occasion, and to UE behavior in cases when the UE has not finished decoding a TB before an earlier HARQ-ACK feedback occasion. Furthermore, some aspects described herein relate to techniques that a network node may use to indicate the multiple HARQ-ACK resources to the UE, and to n-state HARQ-ACK feedback, where n is greater than two such that the n-state HARQ-ACK feedback may be used to differentiate between an ACK to indicate to a correctly decoded TB, a NACK to indicate a failed decoding, and a pending state to indicate that the UE needs more time to complete the attempted decoding due to DDR congestion or other issues.

As indicated above, FIG. 4 is provided as an example. Other examples may differ from what is described with regard to FIG. 4.

FIGS. 5A-5B are diagrams illustrating examples 500 associated with HARQ feedback for high throughput use cases in accordance with the present disclosure. As described herein, example 500 includes communication between a network node 110 and a UE 120. In some aspects, the network node 110 and the UE 120 may communicate in a wireless network, such as wireless network 100. The network node 110 and the UE 120 may communicate via a wireless access link, which may include an uplink and a downlink.

As shown in FIG. 5A, and by reference number 510, the network node 110 may transmit, and the UE 120 may receive, a downlink grant that schedules a PDSCH transmission that carries a TB (e.g., a unit of data that the network node 110 transmits to the UE 120 over an air interface). In some aspects, the downlink grant may be included in a DCI message that indicates various parameters for the PDSCH transmission. For example, in some aspects, the downlink grant may indicate a time and frequency allocation, an MCS, a TB size, and/or other suitable parameters for the PDSCH transmission. Furthermore, in some aspects, the scheduled PDSCH transmission and/or the TB carried in the scheduled PDSCH transmission may be associated with multiple HARQ-ACK feedback occasions associated with different resources in a time domain (e.g., different slots, symbols, or other TTIs).

For example, as shown by reference number 520, the PDSCH transmission and/or TB may be associated with an initial HARQ-ACK feedback occasion (e.g., a first HARQ-ACK resource in time), which may correspond to an initial PUCCH resource associated with a default HARQ-ACK feedback timeline. For example, as shown by reference number 525, the default HARQ-ACK timeline may be associated with a PDSCH processing time, which may be indicated or otherwise associated with an N1 parameter. Accordingly, in cases where the UE 120 receives the scheduled PDSCH transmission and is able to successfully decode the TB prior to the initial HARQ-ACK feedback occasion (e.g., without any DDR congestion or other issues causing a decoding delay), the UE 120 may transmit an ACK to the network node 110 in the initial HARQ-ACK feedback occasion. Additionally, or alternatively, in cases where the UE 120 receives the PDSCH transmission and decoding fails prior to the initial HARQ-ACK feedback occasion (e.g., due to a failed CRC check or other decoding failure), the UE 120 may transmit a NACK to the network node 110 in the initial HARQ-ACK feedback occasion.

Furthermore, as shown by reference number 530, the PDSCH transmission and/or TB may be associated with one or more HARQ-ACK feedback occasions that occur later in time relative to the initial HARQ-ACK feedback occasions, where the one or more HARQ-ACK feedback occasions that are later in time may correspond to one or more PUCCH resources associated with delayed HARQ-ACK feedback. For example, as shown by reference number 535, the delayed HARQ-ACK feedback occasions may be associated with a processing time for delayed ACK/NACK feedback, which may be caused by a slower DDR access time due to one or more DDR onloading and/or offloading operations. Accordingly, in cases where the UE 120 receives the scheduled PDSCH transmission and is unable to finish an attempt to decode the TB prior to the initial HARQ-ACK feedback occasion (e.g., because tasks to offload storage of HARQ LLRs associated with downlink decoding failures and/or onloading HARQ LLRs for downlink retransmissions were postponed to a later slot, symbol, or transmission time interval (TTI)), the later HARQ-ACK feedback occasion(s) allow the UE 120 to spend more time attempting to decode the TB. Accordingly, the UE 120 may then transmit delayed HARQ-ACK feedback for the TB in the later HARQ-ACK feedback occasion(s).

In some aspects, as described herein, the UE 120 may generally transmit an ACK to the network node 110 in a HARQ-ACK feedback occasion in cases where the UE 120 is able to successfully decode the TB prior to the HARQ-ACK feedback occasion. Accordingly, in cases where the UE 120 transmits an ACK to the network node 110 in an earlier HARQ-ACK feedback occasion (e.g., the initial HARQ-ACK feedback occasion or a subsequent HARQ-ACK feedback occasion that is followed by one or more later HARQ-ACK feedback occasions), the UE 120 may skip the later HARQ-ACK feedback occasions without transmitting additional HARQ-ACK feedback for the TB unless one or more conditions are satisfied. For example, in cases where the UE 120 has other UCI (e.g., a scheduling request, CSI, or other HARQ-ACK feedback for other TBs) to transmit to the network node 110 in a HARQ-ACK feedback occasion that follows an earlier HARQ-ACK feedback occasion in which the UE 120 transmitted an ACK, the UE 120 may multiplex the other UCI with a repetition of the ACK transmission for the TB (e.g., repeating the ACK transmission for the TB) in the later HARQ-ACK feedback occasion. In other words, in one or more HARQ-ACK feedback occasions that follow an earlier HARQ-ACK feedback occasion in which the UE 120 transmitted an ACK for a TB, the UE 120 either repeats the ACK transmission (e.g., multiplexed with other UCI) or does not transmit in the later HARQ-ACK feedback occasion(s).

Additionally, or alternatively, in cases where the UE 120 does not finish decoding for a TB before an earlier HARQ-ACK feedback occasion (e.g., a HARQ-ACK feedback occasion that is followed by one or more HARQ-ACK feedback occasions for delayed HARQ-ACK feedback), the UE 120 may transmit a NACK for the TB in the earlier HARQ-ACK feedback occasion or the UE 120 may skip (e.g., not transmit in) the earlier HARQ-ACK feedback occasion. For example, in cases where the UE 120 has not finished decoding for a TB and does not have other HARQ-ACK feedback and/or other UCI to transmit to the network node 110 at the time of a current HARQ-ACK feedback occasion that is followed by one or more HARQ-ACK feedback occasions, the UE 120 may generally skip the HARQ-ACK transmission in the current HARQ-ACK feedback occasion. Alternatively, in cases where the HARQ-ACK feedback for the earlier HARQ-ACK feedback occasion is to be multiplexed with other HARQ-ACK feedback (e.g., for other TBs), the UE 120 may send a NACK to the network node 110 in the earlier HARQ-ACK feedback occasion. For example, the network node 110 may be unable to determine how many bits the UE 120 is to transmit in a given HARQ-ACK feedback occasion if one or more HARQ-ACK feedback transmissions are not included. Accordingly, the UE 120 may send the NACK with the other UCI and/or HARQ-ACK feedback for other TBs to allow the network node 110 to correctly interpret the information transmitted in the HARQ-ACK feedback occasion. Furthermore, in cases where the UE 120 does not finish decoding for a TB before an earlier HARQ-ACK feedback occasion, the UE 120 may transmit delayed HARQ-ACK feedback for the TB (e.g., that required a longer decoding time) in a later HARQ-ACK feedback occasion. Additionally, or alternatively, in cases where the UE finishes the decoding, but the decoding is not correct (e.g., a typical NACK, due to a failed CRC check or other decoding failure), the UE 120 may send a NACK in all HARQ-ACK feedback occasions that occur after the decoding is determined to have failed. Accordingly, from a perspective of the network node 110, the network node 110 may generally not expect to receive an ACK in an earlier HARQ-ACK feedback occasion and a NACK in a later HARQ-ACK feedback occasion (e.g., because a successful decoding in an earlier HARQ-ACK feedback occasion will still be successful in the later HARQ-ACK feedback occasion). However, the reverse can occur, in that the network node 110 may receive a NACK in an earlier HARQ-ACK feedback occasion and an ACK in a later HARQ-ACK feedback occasion (e.g., because decoding that is incomplete in an earlier HARQ-ACK feedback occasion may be completed and result in successful decoding in a later HARQ-ACK feedback occasion).

In some aspects, in cases where the UE 120 transmits and the network node 110 receives an ACK for a given TB in any of the multiple HARQ-ACK feedback occasions associated with the TB, the network node 110 may start to use a HARQ process associated with the TB to transmit new TBs. For example, in some aspects, the UE 120 may transmit the ACK for the TB in the next HARQ-ACK feedback occasion after decoding has succeeded, and in some cases the ACK may be transmitted in a HARQ-ACK feedback occasion that is followed by one or more HARQ-ACK feedback occasions for delayed HARQ-ACK feedback. In such cases, the network node 110 may start to use the HARQ process associated with the successfully decoded TB without having to wait for the last HARQ-ACK feedback occasion (e.g., to avoid stalling HARQ transmissions).

In some aspects, the network node 110 may indicate the PUCCH resources associated with multiple HARQ-ACK feedback occasions to the UE 120 using one or more techniques. For example, as shown by reference number 540-1, the network node 110 may transmit, and the UE 120 may receive, configuration information that indicates a group of multiple PUCCH resources that occur over different slots, symbols, or other TTIs. In such cases, the network node 110 may transmit, and the UE 120 may receive, one or more messages (e.g., together with or separate from the downlink grant) that include a PUCCH resource indicator (PRI), and the PRI may indicate the group of PUCCH resources corresponding to the multiple HARQ-ACK feedback occasions associated with the TB. Additionally, or alternatively, as shown by reference number 540-2, the downlink grant that schedules the PDSCH transmission may include multiple PRIs, where the multiple PRIs each point to or otherwise indicate a respective PUCCH resource that corresponds to a respective HARQ-ACK feedback occasion. Additionally, or alternatively, as shown by reference number 540-3, the downlink grant may contain a PRI for the initial PUCCH resource corresponding to the default HARQ-ACK feedback occasion, and the UE 120 may implicitly derive the later PUCCH resources for delayed HARQ-ACK feedback based on the initial PUCCH resource indicated in the PRI (e.g., based on a fixed timing delta, such as a number of slots, symbols, or TTIs, or the next available slot associated with the same symbol or resource block). In some aspects, in some cases, the multiple HARQ-ACK feedback occasions may be configured or enabled only for a retransmission of a TB (e.g., as indicated based on a new data indicator (NDI)).

Accordingly, in such cases, the UE 120 may assume that there is only a single HARQ-ACK feedback occasion for a new transmission of a TB.

In some aspects, in cases where the UE 120 generates HARQ-ACK feedback for a given PDSCH transmission or TB carried in a PDSCH transmission, the HARQ-ACK feedback may include n-state feedback, where n is greater than two and a set of possible states associated with the n-state feedback includes an ACK, a NACK, and a pending state. For example, in some aspects, the HARQ-ACK feedback that the UE 120 generates and transmits to the network node 110 may include an ACK to indicate that the TB is correctly decoded (e.g., within the default HARQ-ACK timeline or a delayed HARQ-ACK timeline), a NACK to indicate that decoding failed for the TB (e.g., due to poor channel conditions, poor signal-to-interference-plus-noise ratio (SINR) measurements, or other factors) such that the network node 110 needs to schedule a retransmission, or a pending indication to indicate that the UE 120 needs more time to decode the TB because HARQ onloading/offloading congestion has delayed the attempted decoding.

Furthermore, in cases where the pending indication is provided, the UE 120 may indicate a time offset value (e.g., jointly encoded with the pending indication) to indicate to the network node 110 how much time the UE 120 needs to finish decoding. For example, in some aspects, the HARQ-ACK feedback transmitted by the UE 120 may include a 3-state indication to indicate an ACK, a NACK, or a pending state, or the HARQ-ACK feedback transmitted by the UE 120 may include a 4-state indication to indicate an ACK, a NACK, a pending state with a first time offset, and a pending state with a second time offset.

In some aspects, in cases where the UE 120 transmits and the network node 110 receives n-state HARQ-ACK feedback with a pending state or a pending indication, the network node 110 may schedule a HARQ-ACK feedback occasion in a later slot for the TB associated with the pending state or the pending indication. For example, as shown in FIG. 5B, and by reference number 550, the network node 110 may transmit, to the UE 120, a downlink grant that schedules a TB transmission and indicates a first PUCCH resource for the UE 120 to transmit HARQ-ACK feedback for the scheduled TB transmission. As further shown by reference number 560, the UE 120 may transmit, in the first PUCCH resource corresponding to the first HARQ-ACK feedback occasion, the UE 120 may transmit HARQ-ACK feedback with a pending state or pending indication if decoding is incomplete at the time of the first HARQ-ACK feedback occasion. In such cases, as shown by reference number 570, the network node 110 may transmit, to the UE 120, additional control information to schedule a second HARQ-ACK feedback occasion in the later slot (e.g., the additional control information may include a downlink grant, such that the second HARQ-ACK feedback occasion is a second PUCCH resource that carries the HARQ-ACK feedback for the TB after the attempted decoding is complete, or the additional control information may include an uplink grant, such that the second HARQ-ACK feedback occasion is a resource for transmitting a PUSCH that carries uplink data multiplexed with the HARQ-ACK feedback for the TB after the attempted decoding is complete). As such, as shown by reference number 580, the UE 120 can then transmit final HARQ-ACK decoding results in the later slot (e.g., a slot that is subsequent in time relative to the slot for the first HARQ-ACK feedback occasion).

For example, the UE 120 may transmit regular (e.g., 2-state) HARQ-ACK feedback in the later HARQ-ACK transmission occasion that the network node 110 schedules based on the n-state HARQ-ACK feedback with the pending state or pending indication. In this way, one or more later HARQ-ACK feedback occasions may be event-triggered or dynamically scheduled (e.g., based on the UE 120 indicating a need for more time to finish decoding), which may reduce the amount of HARQ-ACK resources that need to be reserved or otherwise occupied to support delayed HARQ-ACK feedback. On the other hand, scheduling multiple HARQ-ACK feedback occasions for a TB without dependence on an event trigger, or n-state HARQ-ACK feedback with a pending state or a pending indication, may reduce the number of bits that are transmitted for each TB. Additionally, or alternatively, the network node 110 may schedule a HARQ-ACK feedback occasion for retransmitting HARQ-ACK feedback for a TB associated with the pending state or the pending indication in a common PUCCH and/or PUSCH transmission (e.g., such that the UE 120 can transmit delayed HARQ-ACK feedback associated with multiple TBs in a single PUCCH/PUSCH transmission). For example, in some aspects, the network node 110 may use a component carrier index and HARQ process to indicate the corresponding HARQ-ACK feedback to be retransmitted (e.g., in a similar manner as a HARQ-ACK retransmission procedure for a Type-3 HARQ-ACK codebook or an enhanced Type-3 HARQ-ACK codebook).

In some aspects, to reduce the overhead associated with the HARQ-ACK feedback in cases where a PDSCH transmission or TB are associated with multiple HARQ-ACK feedback occasions, the UE 120 may transmit n-state HARQ-ACK feedback only in cases where the HARQ-ACK feedback is associated with a HARQ retransmission. For example, the UE 120 may use regular 2-state HARQ-ACK feedback for an initial transmission of a TB, and the UE 120 may use the 3-state or 4-state (or other n-state, where n is greater than two) HARQ-ACK feedback for one or more retransmissions of the TB. Furthermore, in cases where the UE 120 multiplexes the n-state HARQ-ACK feedback (e.g., for one or more retransmissions of a first set of one or more TBs) with regular 2-state HARQ-ACK feedback (e.g., for one or more initial transmissions of a second set of one or more TBs), the UE 120 may transmit the n-state HARQ-ACK feedback and the 2-state HARQ-ACK feedback in a single HARQ-ACK feedback transmission. In this case, the UE 120 may separately generate two HARQ-ACK codebooks, including a first HARQ-ACK codebook for the regular 2-state HARQ-ACK feedback and a second HARQ-ACK codebook for the n-state HARQ-ACK feedback. In such cases, the type of HARQ-ACK feedback (e.g., 2-state versus n-state, where n is greater than 2) may be determined based on a new data indicator (NDI) associated with the corresponding TB, and a downlink assignment indication (DAI) may be interpreted by the UE 120 and/or the network node 110 in accordance with the NDI. Accordingly, when the n-state HARQ-ACK feedback is used, the additional (e.g., pending) state indicates that decoding for the TB is incomplete and that the UE 120 needs more time to finish decoding. Furthermore, some aspects described herein allow the HARQ-ACK feedback type (e.g., 2-state or n-state, where n is greater than 2) to be associated with the NDI and allow regular 2-state HARQ-ACK feedback to be multiplexed with n-state HARQ-ACK based on the NDI. Furthermore, in cases where the network node 110 receives the n-state HARQ-ACK feedback, the network node 110 may reschedule the HARQ-ACK feedback transmission in cases where the pending state is indicated in the n-state HARQ-ACK feedback.

As indicated above, FIGS. 5A-5B are provided as examples. Other examples may differ from what is described with regard to FIGS. 5A-5B.

FIG. 6 is a diagram illustrating an example process 600 performed, for example, at a UE or an apparatus of a UE, in accordance with the present disclosure. Example process 600 is an example where the apparatus or the UE (e.g., UE 120) performs operations associated with HARQ feedback for high throughput use cases.

As shown in FIG. 6, in some aspects, process 600 may include receiving, from a network node, a downlink grant scheduling a PDSCH transmission that includes a TB associated with a first HARQ-ACK feedback occasion and a second HARQ-ACK feedback occasion, wherein the downlink grant schedules at least the first HARQ-ACK feedback occasion associated with the TB associated with the TB (block 610). For example, the UE (e.g., using reception component 802 and/or communication manager 806, depicted in FIG. 8) may receive, from a network node, a downlink grant scheduling a PDSCH transmission that includes a TB associated with a first HARQ-ACK feedback occasion and a second HARQ-ACK feedback occasion, wherein the downlink grant schedules at least the first HARQ-ACK feedback occasion associated with the TB, as described above.

As further shown in FIG. 6, in some aspects, process 600 may include transmitting, to the network node, HARQ feedback for the TB in one or more of the first HARQ-ACK feedback occasion or the second HARQ-ACK feedback occasion associated with the TB (block 620). For example, the UE (e.g., using transmission component 804 and/or communication manager 806, depicted in FIG. 8) may transmit, to the network node, HARQ feedback for the TB in one or more of the first HARQ-ACK feedback occasion or the second HARQ-ACK feedback occasion associated with the TB, as described above.

Process 600 may include additional aspects, such as any single aspect or any combination of aspects described below and/or in connection with one or more other processes described elsewhere herein.

In a first aspect, the first HARQ-ACK feedback occasion is associated with a default processing time for the TB, and the second HARQ-ACK feedback occasion is associated with a delayed processing time for the TB.

In a second aspect, alone or in combination with the first aspect, the HARQ feedback is not transmitted in the second HARQ-ACK feedback occasion based on the HARQ feedback including an ACK transmitted in the first HARQ-ACK feedback occasion.

In a third aspect, alone or in combination with one or more of the first and second aspects, the HARQ feedback includes an ACK that is transmitted in the first HARQ-ACK feedback occasion and a repetition of the ACK that is multiplexed with additional UCI in the second HARQ-ACK feedback occasion.

In a fourth aspect, alone or in combination with one or more of the first through third aspects, the HARQ feedback includes a NACK multiplexed with additional UCI in the first HARQ-ACK feedback occasion based on an attempted decoding for the TB being incomplete at a time of the first HARQ-ACK feedback occasion.

In a fifth aspect, alone or in combination with one or more of the first through fourth aspects, the first HARQ-ACK feedback occasion is skipped based on an attempted decoding for the TB being incomplete at a time of the first HARQ-ACK feedback occasion.

In a sixth aspect, alone or in combination with one or more of the first through fifth aspects, the HARQ feedback is transmitted in the second HARQ-ACK feedback occasion based on an attempted decoding for the TB being incomplete at a time of the first HARQ-ACK feedback occasion.

In a seventh aspect, alone or in combination with one or more of the first through sixth aspects, the HARQ feedback includes a NACK transmitted in the first HARQ-ACK feedback occasion and an ACK transmitted in the second HARQ-ACK feedback occasion.

In an eighth aspect, alone or in combination with one or more of the first through seventh aspects, process 600 includes receiving, from the network node, information configuring a group of PUCCH resources that includes the first HARQ-ACK feedback occasion and the second HARQ-ACK feedback occasion.

In a ninth aspect, alone or in combination with one or more of the first through eighth aspects, the first HARQ-ACK feedback occasion and the second HARQ-ACK feedback occasion are indicated in the downlink grant.

In a tenth aspect, alone or in combination with one or more of the first through ninth aspects, the first HARQ-ACK feedback occasion is indicated in the downlink grant and the second HARQ-ACK feedback occasion is derived from the first HARQ-ACK feedback occasion.

In an eleventh aspect, alone or in combination with one or more of the first through tenth aspects, the first HARQ-ACK feedback occasion and the second HARQ-ACK feedback occasion are configured based on the PDSCH transmission corresponding to a retransmission of the TB.

In a twelfth aspect, alone or in combination with one or more of the first through eleventh aspects, a set of possible states for the HARQ feedback includes an ACK to indicate that the TB was correctly decoded, a negative NACK to indicate decoding failed for the TB, and a pending state to indicate that additional time is needed to attempt decoding for the TB.

In a thirteenth aspect, alone or in combination with one or more of the first through twelfth aspects, the HARQ feedback includes a time offset value to indicate an amount of time needed to finish attempted decoding for the TB when the HARQ feedback includes a pending state to indicate that additional time is needed to attempt decoding for the TB.

In a fourteenth aspect, alone or in combination with one or more of the first through thirteenth aspects, process 600 includes receiving, from the network node, information scheduling the second HARQ-ACK feedback occasion associated with the TB in a slot that is subsequent to a slot in which in the HARQ feedback is transmitted based on the HARQ feedback including a pending state to indicate that additional time is needed to attempt decoding for the TB, and transmitting, to the network node, HARQ feedback indicating a final decoding result for the TB in the second HARQ-ACK feedback occasion.

In a fifteenth aspect, alone or in combination with one or more of the first through fourteenth aspects, the HARQ feedback includes n-state feedback based on the TB corresponding to a HARQ retransmission, where n is greater than 2 and a set of possible states associated with the n-state feedback includes an ACK, a NACK, and a pending state.

In a sixteenth aspect, alone or in combination with one or more of the first through fifteenth aspects, the HARQ feedback includes n-state feedback that is multiplexed with two-state HARQ feedback, where n is greater than two.

In a seventeenth aspect, alone or in combination with one or more of the first through sixteenth aspects, process 600 includes transmitting, in the first HARQ-ACK feedback occasion, an ACK associated with the TB, and receiving a new TB associated with a HARQ process corresponding to the TB associated with the ACK prior to the second HARQ-ACK feedback occasion.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a diagram illustrating an example process 700 performed, for example, at a network node or an apparatus of a network node, in accordance with the present disclosure. Example process 700 is an example where the apparatus or the network node (e.g., network node 110) performs operations associated with HARQ feedback for high throughput use cases.

As shown in FIG. 7, in some aspects, process 700 may include transmitting, to a UE, a downlink grant scheduling a PDSCH transmission that includes a TB associated with a first HARQ-ACK feedback occasion and a second HARQ-ACK feedback occasion, wherein the downlink grant schedules at least the first HARQ-ACK feedback occasion associated with the TB associated with the TB (block 710). For example, the network node (e.g., using transmission component 904 and/or communication manager 906, depicted in FIG. 9) may transmit, to a UE, a downlink grant scheduling a PDSCH transmission that includes a TB associated with a first HARQ-ACK feedback occasion and a second HARQ-ACK feedback occasion, wherein the downlink grant schedules at least the first HARQ-ACK feedback occasion associated with the TB associated with the TB, as described above.

As further shown in FIG. 7, in some aspects, process 700 may include receiving, from the UE, HARQ feedback for the TB in one or more of the first HARQ-ACK feedback occasion or the second HARQ-ACK feedback occasion associated with the TB (block 720). For example, the network node (e.g., using reception component 902 and/or communication manager 906, depicted in FIG. 9) may receive, from the UE, HARQ feedback for the TB in one or more of the first HARQ-ACK feedback occasion or the second HARQ-ACK feedback occasion associated with the TB, as described above.

Process 700 may include additional aspects, such as any single aspect or any combination of aspects described below and/or in connection with one or more other processes described elsewhere herein.

In a first aspect, the first HARQ-ACK feedback occasion is associated with a default processing time for the TB, and the second HARQ-ACK feedback occasion is associated with a delayed processing time for the TB.

In a second aspect, alone or in combination with the first aspect, the HARQ feedback is not transmitted in the second HARQ-ACK feedback occasion based on the HARQ feedback including an ACK transmitted in the first HARQ-ACK feedback occasion.

In a third aspect, alone or in combination with one or more of the first and second aspects, the HARQ feedback includes an ACK that is transmitted in the first HARQ-ACK feedback occasion and a repetition of the ACK that is multiplexed with additional UCI in the second HARQ-ACK feedback occasion.

In a fourth aspect, alone or in combination with one or more of the first through third aspects, the HARQ feedback includes a NACK multiplexed with additional UCI in the first HARQ-ACK feedback occasion based on an attempted decoding for the TB being incomplete at a time of the first HARQ-ACK feedback occasion.

In a fifth aspect, alone or in combination with one or more of the first through fourth aspects, the first HARQ-ACK feedback occasion is skipped based on an attempted decoding for the TB being incomplete at a time of the first HARQ-ACK feedback occasion.

In a sixth aspect, alone or in combination with one or more of the first through fifth aspects, the HARQ feedback is transmitted in the second HARQ-ACK feedback occasion based on an attempted decoding for the TB being incomplete at a time of the first HARQ-ACK feedback occasion.

In a seventh aspect, alone or in combination with one or more of the first through sixth aspects, the HARQ feedback includes a NACK transmitted in the first HARQ-ACK feedback occasion and an ACK transmitted in the second HARQ-ACK feedback occasion.

In an eighth aspect, alone or in combination with one or more of the first through seventh aspects, process 700 includes receiving, in the first HARQ-ACK feedback occasion, an ACK associated with the TB, and transmitting a new TB associated with a HARQ process corresponding to the TB associated with the ACK prior to the second HARQ-ACK feedback occasion.

In a ninth aspect, alone or in combination with one or more of the first through eighth aspects, process 700 includes transmitting, to the UE, information configuring a group of PUCCH resources that includes the first HARQ-ACK feedback occasion and the second HARQ-ACK feedback occasion.

In a tenth aspect, alone or in combination with one or more of the first through ninth aspects, the first HARQ-ACK feedback occasion and the second HARQ-ACK feedback occasion are indicated in the downlink grant.

In an eleventh aspect, alone or in combination with one or more of the first through tenth aspects, the first HARQ-ACK feedback occasion is indicated in the downlink grant and the second HARQ-ACK feedback occasion is derived from the first HARQ-ACK feedback occasion.

In a twelfth aspect, alone or in combination with one or more of the first through eleventh aspects, the first HARQ-ACK feedback occasion and the second HARQ-ACK feedback occasion are configured based on the PDSCH transmission corresponding to a retransmission of the TB.

In a thirteenth aspect, alone or in combination with one or more of the first through twelfth aspects, a set of possible states for the HARQ feedback includes an ACK to indicate that the TB was correctly decoded, a NACK to indicate decoding failed for the TB, and a pending state to indicate that additional time is needed to attempt decoding for the TB.

In a fourteenth aspect, alone or in combination with one or more of the first through thirteenth aspects, the HARQ feedback includes a time offset value to indicate an amount of time needed to finish attempted decoding for the TB when the HARQ feedback includes a pending state to indicate that additional time is needed to attempt decoding for the TB.

In a fifteenth aspect, alone or in combination with one or more of the first through fourteenth aspects, process 700 includes transmitting, to the UE, information scheduling the second HARQ-ACK feedback occasion associated with the TB in a slot that is subsequent to a slot in which the HARQ feedback is transmitted based on the HARQ feedback including a pending state to indicate that additional time is needed to attempt decoding for the TB, and receiving, from the UE, HARQ feedback indicating a final decoding result for the TB in the second HARQ-ACK feedback occasion.

In a sixteenth aspect, alone or in combination with one or more of the first through fifteenth aspects, the HARQ feedback includes n-state feedback based on the TB corresponding to a HARQ retransmission, where n is greater than 2 and a set of possible states associated with the n-state feedback includes an ACK, a NACK, and a pending state.

In a seventeenth aspect, alone or in combination with one or more of the first through sixteenth aspects, the HARQ feedback includes n-state feedback that is multiplexed with two-state HARQ feedback, where n is greater than two.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
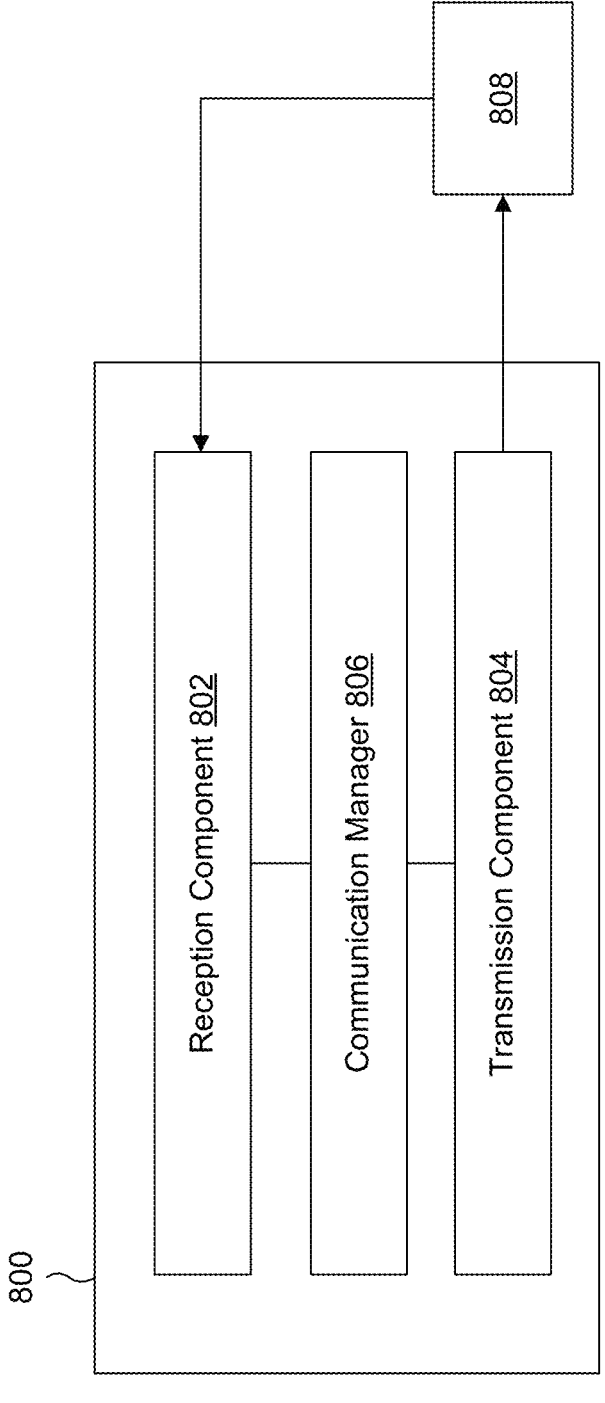
FIGS. 8-9 are diagrams of example apparatuses for wireless communication in accordance with the present disclosure.

FIG. 8 is a diagram of an example apparatus 800 for wireless communication, in accordance with the present disclosure. The apparatus 800 may be a UE, or a UE may include the apparatus 800. In some aspects, the apparatus 800 includes a reception component 802, a transmission component 804, and/or a communication manager 806, which may be in communication with one another (for example, via one or more buses and/or one or more other components). In some aspects, the communication manager 806 is the communication manager 140 described in connection with FIG. 1. As shown, the apparatus 800 may communicate with another apparatus 808, such as a UE or a network node (such as a CU, a DU, an RU, or a base station), using the reception component 802 and the transmission component 804.

In some aspects, the apparatus 800 may be configured to perform one or more operations described herein in connection with FIGS. 5A-5B. Additionally, or alternatively, the apparatus 800 may be configured to perform one or more processes described herein, such as process 600 of FIG. 6. In some aspects, the apparatus 800 and/or or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 802 may receive communications, such as reference signals, control information, data communications, or a combination thereof, from the apparatus 808. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, one or more modems, one or more demodulators, one or more MIMO detectors, one or more receive processors, one or more controllers/processors, one or more memories, or a combination thereof, of the UE described in connection with FIG. 2.

The transmission component 804 may transmit communications, such as reference signals, control information, data communications, or a combination thereof, to the apparatus 808. In some aspects, one or more other components of the apparatus 800 may generate communications and may provide the generated communications to the transmission component 804 for transmission to the apparatus 808. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 808. In some aspects, the transmission component 804 may include one or more antennas, one or more modems, one or more modulators, one or more transmit MIMO processors, one or more transmit processors, one or more controllers/processors, one or more memories, or a combination thereof, of the UE described in connection with FIG. 2. In some aspects, the transmission component 804 may be co-located with the reception component 802 in one or more transceivers.

The communication manager 806 may support operations of the reception component 802 and/or the transmission component 804. For example, the communication manager 806 may receive information associated with configuring reception of communications by the reception component 802 and/or transmission of communications by the transmission component 804. Additionally, or alternatively, the communication manager 806 may generate and/or provide control information to the reception component 802 and/or the transmission component 804 to control reception and/or transmission of communications.

The reception component 802 may receive, from a network node, a downlink grant scheduling a PDSCH transmission that includes a TB associated with a first HARQ-ACK feedback occasion and a second HARQ-ACK feedback occasion, wherein the downlink grant schedules at least the first HARQ-ACK feedback occasion associated with the TB associated with the TB. The transmission component 804 may transmit, to the network node, HARQ feedback for the TB in one or more of the first HARQ-ACK feedback occasion or the second HARQ-ACK feedback occasion associated with the TB.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
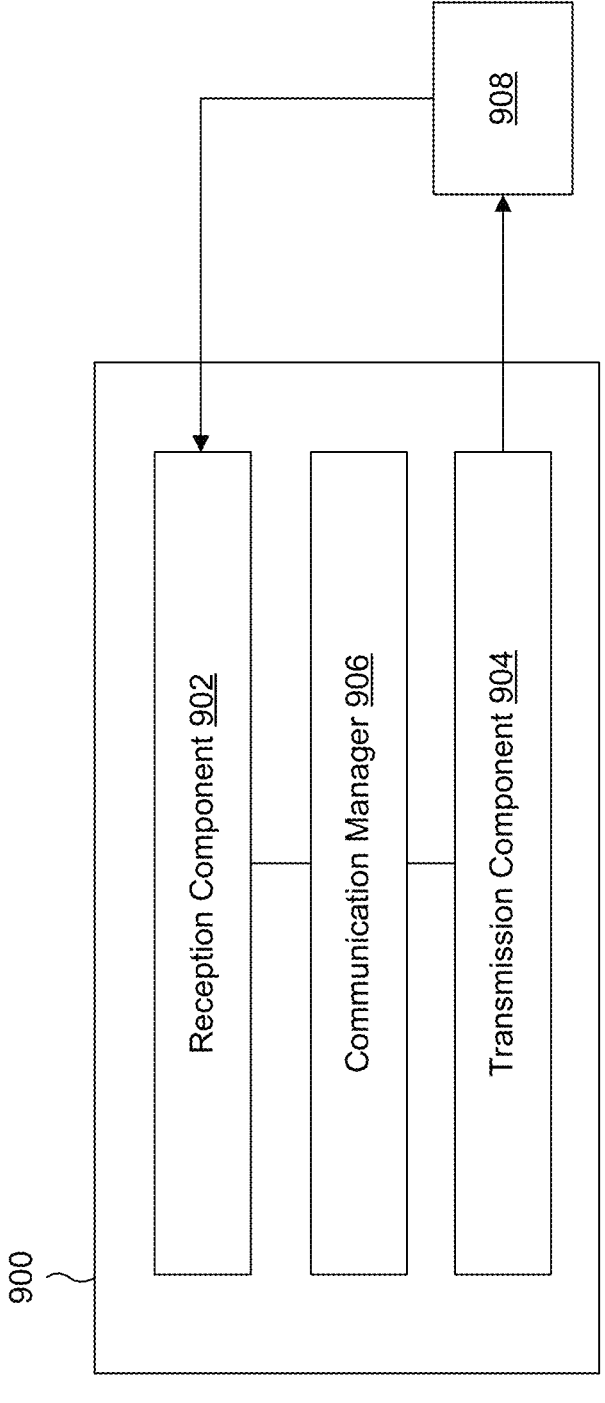

FIG. 9 is a diagram of an example apparatus 900 for wireless communication, in accordance with the present disclosure. The apparatus 900 may be a network node, or a network node may include the apparatus 900. In some aspects, the apparatus 900 includes a reception component 902, a transmission component 904, and/or a communication manager 906, which may be in communication with one another (for example, via one or more buses and/or one or more other components). In some aspects, the communication manager 906 is the communication manager 150 described in connection with FIG. 1. As shown, the apparatus 900 may communicate with another apparatus 908, such as a UE or a network node (such as a CU, a DU, an RU, or a base station), using the reception component 902 and the transmission component 904.

In some aspects, the apparatus 900 may be configured to perform one or more operations described herein in connection with FIGS. 5A-5B. Additionally, or alternatively, the apparatus 900 may be configured to perform one or more processes described herein, such as process 700 of FIG. 7. In some aspects, the apparatus 900 and/or one or more components shown in FIG. 9 may include one or more components of the network node described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 902 may receive communications, such as reference signals, control information, data communications, or a combination thereof, from the apparatus 908. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, one or more modems, one or more demodulators, one or more MIMO detectors, one or more receive processors, one or more controllers/processors, one or more memories, or a combination thereof, of the network node described in connection with FIG. 2. In some aspects, the reception component 902 and/or the transmission component 904 may include or may be included in a network interface. The network interface may be configured to obtain and/or output signals for the apparatus 900 via one or more communications links, such as a backhaul link, a midhaul link, and/or a fronthaul link.

The transmission component 904 may transmit communications, such as reference signals, control information, data communications, or a combination thereof, to the apparatus 908. In some aspects, one or more other components of the apparatus 900 may generate communications and may provide the generated communications to the transmission component 904 for transmission to the apparatus 908. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 904 may include one or more antennas, one or more modems, one or more modulators, one or more transmit MIMO processors, one or more transmit processors, one or more controllers/processors, one or more memories, or a combination thereof, of the network node described in connection with FIG. 2. In some aspects, the transmission component 904 may be co-located with the reception component 902 in one or more transceivers.

The communication manager 906 may support operations of the reception component 902 and/or the transmission component 904. For example, the communication manager 906 may receive information associated with configuring reception of communications by the reception component 902 and/or transmission of communications by the transmission component 904. Additionally, or alternatively, the communication manager 906 may generate and/or provide control information to the reception component 902 and/or the transmission component 904 to control reception and/or transmission of communications.

The transmission component 904 may transmit, to a UE, a downlink grant scheduling a PDSCH transmission that includes a TB associated with a first HARQ-ACK feedback occasion and a second HARQ-ACK feedback occasion, wherein the downlink grant schedules at least the first HARQ-ACK feedback occasion associated with the TB associated with the TB. The reception component 902 may receive, from the UE, HARQ feedback for the TB in one or more of the first HARQ-ACK feedback occasion or the second HARQ-ACK feedback occasion associated with the TB.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a UE, comprising: receiving, from a network node, a downlink grant scheduling a PDSCH transmission that includes a TB associated with a first HARQ-ACK feedback occasion and a second HARQ-ACK feedback occasion, wherein the downlink grant schedules at least the first HARQ-ACK feedback occasion associated with the TB associated with the TB; and transmitting, to the network node, HARQ feedback for the TB in one or more of the first HARQ-ACK feedback occasion or the second HARQ-ACK feedback occasion associated with the TB.

Aspect 2: The method of Aspect 1, wherein the first HARQ-ACK feedback occasion is associated with a default processing time for the TB, and wherein the second HARQ-ACK feedback occasion is associated with a delayed processing time for the TB.

Aspect 3: The method of any of Aspects 1-2, wherein the HARQ feedback is not transmitted in the second HARQ-ACK feedback occasion based on the HARQ feedback including an ACK transmitted in the first HARQ-ACK feedback occasion.

Aspect 4: The method of any of Aspects 1-3, wherein the HARQ feedback includes an ACK that is transmitted in the first HARQ-ACK feedback occasion and a repetition of the ACK that is multiplexed with additional UCI in the second HARQ-ACK feedback occasion.

Aspect 5: The method of any of Aspects 1-4, wherein the HARQ feedback includes a NACK multiplexed with additional UCI in the first HARQ-ACK feedback occasion based on an attempted decoding for the TB being incomplete at a time of the first HARQ-ACK feedback occasion.

Aspect 6: The method of any of Aspects 1-5, wherein the first HARQ-ACK feedback occasion is skipped based on an attempted decoding for the TB being incomplete at a time of the first HARQ-ACK feedback occasion.

Aspect 7: The method of any of Aspects 1-6, wherein the HARQ feedback is transmitted in the second HARQ-ACK feedback occasion based on an attempted decoding for the TB being incomplete at a time of the first HARQ-ACK feedback occasion.

Aspect 8: The method of any of Aspects 1-7, wherein the HARQ feedback includes a NACK transmitted in the first HARQ-ACK feedback occasion and an ACK transmitted in the second HARQ-ACK feedback occasion.

Aspect 9: The method of any of Aspects 1-8, further comprising: receiving, from the network node, information configuring a group of PUCCH resources that includes the first HARQ-ACK feedback occasion and the second HARQ-ACK feedback occasion.

Aspect 10: The method of any of Aspects 1-9, wherein the first HARQ-ACK feedback occasion and the second HARQ-ACK feedback occasion are indicated in the downlink grant.

Aspect 11: The method of any of Aspects 1-10, wherein the first HARQ-ACK feedback occasion is indicated in the downlink grant and the second HARQ-ACK feedback occasion is derived from the first HARQ-ACK feedback occasion.

Aspect 12: The method of any of Aspects 1-11, wherein the first HARQ-ACK feedback occasion and the second HARQ-ACK feedback occasion are configured based on the PDSCH transmission corresponding to a retransmission of the TB.

Aspect 13: The method of any of Aspects 1-12, wherein a set of possible states for the HARQ feedback includes an ACK to indicate that the TB was correctly decoded, a NACK to indicate decoding failed for the TB, and a pending state to indicate that additional time is needed to attempt decoding for the TB.

Aspect 14: The method of any of Aspects 1-13, wherein the HARQ feedback includes a time offset value to indicate an amount of time needed to finish attempted decoding for the TB when the HARQ feedback includes a pending state to indicate that additional time is needed to attempt decoding for the TB.

Aspect 15: The method of any of Aspects 1-14, further comprising: receiving, from the network node, information scheduling the second HARQ-ACK feedback occasion associated with the TB in a slot that is subsequent to a slot in which in the HARQ feedback is transmitted based on the HARQ feedback including a pending state to indicate that additional time is needed to attempt decoding for the TB; and transmitting, to the network node, HARQ feedback indicating a final decoding result for the TB in the second HARQ-ACK feedback occasion.

Aspect 16: The method of any of Aspects 1-15, wherein the HARQ feedback includes n-state feedback based on the TB corresponding to a HARQ retransmission, where n is greater than 2 and a set of possible states associated with the n-state feedback includes an ACK, a NACK, and a pending state.

Aspect 17: The method of any of Aspects 1-16, wherein the HARQ feedback includes n-state feedback that is multiplexed with two-state HARQ feedback, where n is greater than two.

Aspect 18: The method of any of Aspects 1-17, further comprising: transmitting, in the first HARQ-ACK feedback occasion, an ACK associated with the TB; and receiving a new TB associated with a HARQ process corresponding to the TB associated with the ACK prior to the second HARQ-ACK feedback occasion.

Aspect 19: A method of wireless communication performed by a network node, comprising: transmitting, to a UE, a downlink grant scheduling a PDSCH transmission that includes a TB associated with a first HARQ-ACK feedback occasion and a second HARQ-ACK feedback occasion, wherein the downlink grant schedules at least the first HARQ-ACK feedback occasion associated with the TB associated with the TB; and receiving, from the UE, HARQ feedback for the TB in one or more of the first HARQ-ACK feedback occasion or the second HARQ-ACK feedback occasion associated with the TB.

Aspect 20: The method of Aspect 19, wherein the first HARQ-ACK feedback occasion is associated with a default processing time for the TB, and wherein the second HARQ-ACK feedback occasion is associated with a delayed processing time for the TB.

Aspect 21: The method of any of Aspects 19-20, wherein the HARQ feedback is not transmitted in the second HARQ-ACK feedback occasion based on the HARQ feedback including an ACK transmitted in the first HARQ-ACK feedback occasion.

Aspect 22: The method of any of Aspects 19-21, wherein the HARQ feedback includes an ACK that is transmitted in the first HARQ-ACK feedback occasion and a repetition of the ACK that is multiplexed with additional UCI in the second HARQ-ACK feedback occasion.

Aspect 23: The method of any of Aspects 19-22, wherein the HARQ feedback includes a NACK multiplexed with additional UCI in the first HARQ-ACK feedback occasion based on an attempted decoding for the TB being incomplete at a time of the first HARQ-ACK feedback occasion.

Aspect 24: The method of any of Aspects 19-23, wherein the first HARQ-ACK feedback occasion is skipped based on an attempted decoding for the TB being incomplete at a time of the first HARQ-ACK feedback occasion.

Aspect 25: The method of any of Aspects 19-24, wherein the HARQ feedback is transmitted in the second HARQ-ACK feedback occasion based on an attempted decoding for the TB being incomplete at a time of the first HARQ-ACK feedback occasion.

Aspect 26: The method of any of Aspects 19-25, wherein the HARQ feedback includes a NACK transmitted in the first HARQ-ACK feedback occasion and an ACK transmitted in the second HARQ-ACK feedback occasion.

Aspect 27: The method of any of Aspects 19-26, further comprising: receiving, in the first HARQ-ACK feedback occasion, an ACK associated with the TB; and transmitting a new TB associated with a HARQ process corresponding to the TB associated with the ACK prior to the second HARQ-ACK feedback occasion.

Aspect 28: The method of any of Aspects 19-27, further comprising: transmitting, to the UE, information configuring a group of PUCCH resources that includes the first HARQ-ACK feedback occasion and the second HARQ-ACK feedback occasion.

Aspect 29: The method of any of Aspects 19-28, wherein the first HARQ-ACK feedback occasion and the second HARQ-ACK feedback occasion are indicated in the downlink grant.

Aspect 30: The method of any of Aspects 19-29, wherein the first HARQ-ACK feedback occasion is indicated in the downlink grant and the second HARQ-ACK feedback occasion is derived from the first HARQ-ACK feedback occasion.

Aspect 31: The method of any of Aspects 19-30, wherein the first HARQ-ACK feedback occasion and the second HARQ-ACK feedback occasion are configured based on the PDSCH transmission corresponding to a retransmission of the TB.

Aspect 32: The method of any of Aspects 19-31, wherein a set of possible states for the HARQ feedback includes an ACK to indicate that the TB was correctly decoded, a NACK to indicate decoding failed for the TB, and a pending state to indicate that additional time is needed to attempt decoding for the TB.

Aspect 33: The method of any of Aspects 19-32, wherein the HARQ feedback includes a time offset value to indicate an amount of time needed to finish attempted decoding for the TB when the HARQ feedback includes a pending state to indicate that additional time is needed to attempt decoding for the TB.

Aspect 34: The method of any of Aspects 19-33, further comprising: transmitting, to the UE, information scheduling the second HARQ-ACK feedback occasion associated with the TB in a slot that is subsequent to a slot in which in the HARQ feedback is transmitted based on the HARQ feedback including a pending state to indicate that additional time is needed to attempt decoding for the TB; and receiving, from the UE, HARQ feedback indicating a final decoding result for the TB in the second HARQ-ACK feedback occasion.

Aspect 35: The method of any of Aspects 19-34, wherein the HARQ feedback includes n-state feedback based on the TB corresponding to a HARQ retransmission, where n is greater than 2 and a set of possible states associated with the n-state feedback includes an ACK, a NACK, and a pending state.

Aspect 36: The method of any of Aspects 19-35, wherein the HARQ feedback includes n-state feedback that is multiplexed with two-state HARQ feedback, where n is greater than two.

Aspect 37: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-36.

Aspect 38: An apparatus for wireless communication at a device, the apparatus comprising one or more memories and one or more processors coupled to the one or more memories, the one or more processors configured to cause the device to perform the method of one or more of Aspects 1-36.

Aspect 39: An apparatus for wireless communication, the apparatus comprising at least one means for performing the method of one or more of Aspects 1-36.

Aspect 40: A non-transitory computer-readable medium storing code for wireless communication, the code comprising instructions executable by one or more processors to perform the method of one or more of Aspects 1-36.

Aspect 41: A non-transitory computer-readable medium storing a set of instructions for wireless communication, the set of instructions comprising one or more instructions that, when executed by one or more processors of a device, cause the device to perform the method of one or more of Aspects 1-36.

Aspect 42: A device for wireless communication, the device comprising a processing system that includes one or more processors and one or more memories coupled with the one or more processors, the processing system configured to cause the device to perform the method of one or more of Aspects 1-36.

Aspect 43: An apparatus for wireless communication at a device, the apparatus comprising one or more memories and one or more processors coupled to the one or more memories, the one or more processors individually or collectively configured to cause the device to perform the method of one or more of Aspects 1-36.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and at least one of software or firmware. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein May be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein. A component being configured to perform a function means that the component has a capability to perform the function, and does not require the function to be actually performed by the component, unless noted otherwise.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

As used herein, a phrase referring to "at least one of" a list of items refers to any combination of those items, including single members. As an example, "at least one of: a, b, or c"

is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based on or otherwise in association with" unless explicitly stated otherwise. Also, as used herein, the term "or" is intended to be inclusive when used in a series and may be used interchangeably with "and/or," unless explicitly stated otherwise (for example, if used in combination with "either" or "only one of"). It should be understood that "one or more" is equivalent to "at least one."

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set.

What is claimed is:

1. A user equipment (UE) for wireless communication, comprising:

one or more memories; and one or more processors, coupled to the one or more memories, configured to cause the UE to:

receive, from a network node, a downlink grant scheduling a physical downlink shared channel (PDSCH) transmission that includes a transport block (TB) associated with a first hybrid automatic repeat request (HARQ) acknowledgment (HARQ-ACK) feedback occasion and a second HARQ-ACK feedback occasion, wherein the downlink grant schedules at least the first HARQ-ACK feedback occasion associated with the TB; and transmit, to the network node, HARQ feedback for the TB in one or more of the first HARQ-ACK feedback occasion or the second HARQ-ACK feedback occasion associated with the TB, wherein the HARQ feedback includes n-state feedback, and wherein a set of possible states associated with the n-state feedback includes an acknowledgement (ACK), a negative acknowledgement (NACK), and a pending state.

2. The UE of claim 1, wherein the first HARQ-ACK feedback occasion is associated with a default processing time for the TB, and wherein the second HARQ-ACK feedback occasion is associated with a delayed processing time for the TB.

3. The UE of claim 1, wherein the HARQ feedback is not transmitted in the second HARQ-ACK feedback occasion based on the HARQ feedback including the ACK, wherein the ACK is transmitted in the first HARQ-ACK feedback occasion.

4. The UE of claim 1, wherein the HARQ feedback includes the ACK, wherein the ACK is transmitted in the first HARQ-ACK feedback occasion and a repetition of the ACK is multiplexed with additional uplink control information (UCI) in the second HARQ-ACK feedback occasion.

5. The UE of claim 1, wherein the HARQ feedback includes the NACK, wherein the NACK is multiplexed with additional uplink control information (UCI) in the first HARQ-ACK feedback occasion based on an attempted decoding for the TB being incomplete at a time of the first HARQ-ACK feedback occasion.

6. The UE of claim 1, wherein the first HARQ-ACK feedback occasion is skipped based on an attempted decoding for the TB being incomplete at a time of the first HARQ-ACK feedback occasion.

7. The UE of claim 1, wherein the HARQ feedback is transmitted in the second HARQ-ACK feedback occasion based on an attempted decoding for the TB being incomplete at a time of the first HARQ-ACK feedback occasion.

8. The UE of claim 1, wherein the HARQ feedback includes the NACK, wherein the NACK is transmitted in the first HARQ-ACK feedback occasion and the ACK is transmitted in the second HARQ-ACK feedback occasion.

9. The UE of claim 1, wherein the one or more processors are further configured to cause the UE to:

receive, from the network node, information configuring a group of physical uplink control channel (PUCCH) resources that includes the first HARQ-ACK feedback occasion and the second HARQ-ACK feedback occasion.

10. The UE of claim 1, wherein the first HARQ-ACK feedback occasion and the second HARQ-ACK feedback occasion are indicated in the downlink grant.

11. The UE of claim 1, wherein the first HARQ-ACK feedback occasion is indicated in the downlink grant and the second HARQ-ACK feedback occasion is derived from the first HARQ-ACK feedback occasion.

12. The UE of claim 1, wherein the first HARQ-ACK feedback occasion and the second HARQ-ACK feedback occasion are configured based on the PDSCH transmission corresponding to a retransmission of the TB.

13. The UE of claim 1, wherein the ACK indicates that the TB was correctly decoded, the NACK indicates decoding failed for the TB, and the pending state indicates that additional time is needed to attempt decoding for the TB.

14. The UE of claim 1, wherein the HARQ feedback includes a time offset value to indicate an amount of time needed to finish attempted decoding for the TB when the HARQ feedback includes the pending state, wherein pending state indicates that additional time is needed to attempt decoding for the TB.

15. The UE of claim 1, wherein the one or more processors are further configured to cause the UE to:

receive, from the network node, information scheduling the second HARQ-ACK feedback occasion associated with the TB in a slot that is subsequent to a slot in which the HARQ feedback is transmitted based on the HARQ feedback including the pending state, wherein the pending state indicates that additional time is needed to attempt decoding for the TB; and transmit, to the network node, HARQ feedback indicating a final decoding result for the TB in the second HARQ-ACK feedback occasion.

16. The UE of claim 1, wherein the HARQ feedback includes the n-state feedback based on the TB corresponding to a HARQ retransmission, and wherein n is greater than two.

17. The UE of claim 1, wherein the n-state feedback is multiplexed with two-state HARQ feedback, where n is greater than two.

18. The UE of claim 1, wherein the one or more processors are further configured to cause the UE to:

transmit, in the first HARQ-ACK feedback occasion, the ACK; and receive a new TB associated with a HARQ process corresponding to the TB associated with the ACK prior to the second HARQ-ACK feedback occasion.

19. A network node for wireless communication, comprising:

one or more memories; and one or more processors, coupled to the one or more memories, configured to cause the network node to:

transmit, to a user equipment (UE), a downlink grant scheduling a physical downlink shared channel (PDSCH) transmission that includes a transport block (TB) associated with a first hybrid automatic repeat request (HARQ) acknowledgment (HARQ-ACK) feedback occasion and a second HARQ-ACK feedback occasion, wherein the downlink grant schedules at least the first HARQ-ACK feedback occasion associated with the TB; and receive, from the UE, HARQ feedback for the TB in one or more of the first HARQ-ACK feedback occasion or the second HARQ-ACK feedback occasion associated with the TB, wherein the HARQ feedback includes n-state feedback, and wherein a set of possible states associated with the n-state feedback includes an acknowledgement (ACK), a negative acknowledgement (NACK), and a pending state.

20. The network node of claim 19, wherein the first HARQ-ACK feedback occasion is associated with a default processing time for the TB, and wherein the second HARQ-ACK feedback occasion is associated with a delayed processing time for the TB.

21. The network node of claim 19, wherein the HARQ feedback is not transmitted in the second HARQ-ACK feedback occasion based on the HARQ feedback including the ACK, wherein the ACK is transmitted in the first HARQ-ACK feedback occasion.

22. The network node of claim 19, wherein the HARQ feedback includes the ACK, wherein the ACK is transmitted in the first HARQ-ACK feedback occasion and a repetition of the ACK is multiplexed with additional uplink control information (UCI) in the second HARQ-ACK feedback occasion.

23. The network node of claim 19, wherein the HARQ feedback includes the NACK, wherein the NACK is multiplexed with additional uplink control information (UCI) in the first HARQ-ACK feedback occasion based on an attempted decoding for the TB being incomplete at a time of the first HARQ-ACK feedback occasion.

24. The network node of claim 19, wherein the first HARQ-ACK feedback occasion is skipped based on an attempted decoding for the TB being incomplete at a time of the first HARQ-ACK feedback occasion.

25. The network node of claim 19, wherein the HARQ feedback is transmitted in the second HARQ-ACK feedback occasion based on an attempted decoding for the TB being incomplete at a time of the first HARQ-ACK feedback occasion.

26. The network node of claim 19, wherein the one or more processors are further configured to cause the network node to:

receive, in the first HARQ-ACK feedback occasion, the ACK; and transmit a new TB associated with a HARQ process corresponding to the TB associated with the ACK prior to the second HARQ-ACK feedback occasion.

27. The network node of claim 19, wherein the ACK indicates that the TB was correctly decoded, the NACK indicates decoding failed for the TB, and the pending state indicates that additional time is needed to attempt decoding for the TB.

28. The network node of claim 19, wherein the one or more processors are further configured to cause the network node to:

transmit, to the UE, information scheduling the second HARQ-ACK feedback occasion associated with the TB in a slot that is subsequent to a slot in which the HARQ feedback is transmitted based on the HARQ feedback including the pending state to indicate that additional time is needed to attempt decoding for the TB; and receive, from the UE, HARQ feedback indicating a final decoding result for the TB in the second HARQ-ACK feedback occasion.

29. A method of wireless communication performed by a user equipment (UE), comprising:

receiving, from a network node, a downlink grant scheduling a physical downlink shared channel (PDSCH) transmission that includes a transport block (TB) associated with a first hybrid automatic repeat request (HARQ) acknowledgment (HARQ-ACK) feedback occasion and a second HARQ-ACK feedback occasion, wherein the downlink grant schedules at least the first HARQ-ACK feedback occasion associated with the TB; and transmitting, to the network node, HARQ feedback for the TB in one or more of the first HARQ-ACK feedback occasion or the second HARQ-ACK feedback occasion associated with the TB, wherein the HARQ feedback includes n-state feedback, and wherein a set of possible states associated with the n-state feedback includes an acknowledgement (ACK), a negative acknowledgement (NACK), and a pending state.

30. A method of wireless communication performed by a network node, comprising:

transmitting, to a user equipment (UE), a downlink grant scheduling a physical downlink shared channel (PDSCH) transmission that includes a transport block (TB) associated with a first hybrid automatic repeat request (HARQ) acknowledgment (HARQ-ACK) feedback occasion and a second HARQ-ACK feedback occasion, wherein the downlink grant schedules at least the first HARQ-ACK feedback occasion associated with the TB; and receiving, from the UE, HARQ feedback for the TB in one or more of the first HARQ-ACK feedback occasion or the second HARQ-ACK feedback occasion associated with the TB, wherein the HARQ feedback includes n-state feedback, and wherein a set of possible states associated with the n-state feedback includes an acknowledgement (ACK), a negative acknowledgement (NACK), and a pending state.

* * * * *